(12) United States Patent
Moon et al.

(10) Patent No.: US 9,436,551 B2
(45) Date of Patent: Sep. 6, 2016

(54) METHOD FOR CODEC-BASED RECOVERY OF A VIDEO USING A CLUSTER SEARCH

(75) Inventors: Ki Woong Moon, Seoul (KR); Joong Lee, Seoul (KR); Gi Hyun Na, Bucheon-si (KR); Kyu Sun Shim, Seoul (KR)

(73) Assignee: REPUBLIC OF KOREA (NATIONAL FORENSIC SERVICE DIRECTOR MINISTRY OF PUBLIC ADMINISTRATION AND SECURITY), Seoul (KR)

( * ) Notice: Subject to any disclaimer, the term of this patent is extended or adjusted under 35 U.S.C. 154(b) by 209 days.

(21) Appl. No.: 14/234,414

(22) PCT Filed: Jul. 25, 2012

(86) PCT No.: PCT/KR2012/005940
§ 371 (c)(1),
(2), (4) Date: Jan. 23, 2014

(87) PCT Pub. No.: WO2013/015614
PCT Pub. Date: Jan. 31, 2013

(65) Prior Publication Data
US 2014/0164336 A1  Jun. 12, 2014

(30) Foreign Application Priority Data

Jul. 25, 2011 (KR) .................. 10-2011-0073525
Jan. 10, 2012 (KR) .................. 10-2012-0002862

(51) Int. Cl.
| | | |
|---|---|---|
| *G06F 7/00* | (2006.01) | |
| *G06F 17/30* | (2006.01) | |
| *H04B 1/66* | (2006.01) | |
| *G06F 11/14* | (2006.01) | |
| *H04N 9/888* | (2006.01) | |
| *H04N 19/895* | (2014.01) | |

(52) U.S. Cl.
CPC .......... *G06F 11/1402* (2013.01); *H04N 9/888* (2013.01); *H04N 19/895* (2014.11)

(58) Field of Classification Search
USPC .............. 707/674, 737; 375/240.26; 348/699
See application file for complete search history.

(56) References Cited

U.S. PATENT DOCUMENTS

| | | | |
|---|---|---|---|
| 7,386,049 B2 * | 6/2008 | Garrido ................ | H04N 7/0125 348/699 |
| 7,539,707 B2 | 5/2009 | Prahlad et al. | |
| 2005/0177777 A1 | 8/2005 | Seaburg et al. | |
| 2012/0288015 A1 * | 11/2012 | Zhang ..................... | H04N 7/54 375/240.26 |

FOREIGN PATENT DOCUMENTS

KR   10-2001-0047092 A    6/2001

OTHER PUBLICATIONS

International Search Report for International Application No. PCT/KR2012/005940.

* cited by examiner

*Primary Examiner* — Hung T Vy
(74) *Attorney, Agent, or Firm* — LRK Patent Law Firm

(57) ABSTRACT

A method for codec-based recovery of a video, which includes recovering an image by combining image decoding information and non-overwritten image frames, is provided. The method includes: a cluster extraction step of extracting a pre-cluster region; a region extraction step of extracting, from the pre-cluster region extracted in the cluster extraction step, an M frame region encoded using an MPEG-4 visual codec and an M decoding region; a combining step of combining the M frame region and the M decoding region extracted in the region extraction step and listing the combination; and a recovering step of decoding the M frame region and the M decoding region, listed in the combining step, to be recovered as an image.

8 Claims, 25 Drawing Sheets

FIG. 4

|  |  |  |  |  | 1603 |  |  |  |  |  | 1605 |  |  | 1601 |  |  |
|--|--|--|--|--|--|--|--|--|--|--|--|--|--|--|--|--|
|  |  | 1101 |  | 1503 |  |  |  | 1101 |  | 1505 | 1101 |  | 1505 |  |  |  |
| offset | 0 | 1 | 2 | 3 | 4 | 5 | 6 | 7 | 8 | 9 | A | B | C | D | E | F |
| 002DF6F0 | 00 | 01 | 00 | 00 | 00 | 00 | 00 | 00 | 00 | 00 | 00 | 00 | 00 | 00 | 00 | 00 |
| 002DF700 | 00 | 00 | 00 | 00 | 00 | 00 | 00 | 00 | 00 | 00 | 00 | 00 | 00 | 00 | 00 | 00 |
| 002DF710 | 00 | 00 | 00 | 18 | FF | FF | 00 | 00 | 00 | 45 | 65 | 73 | 64 | 73 | 00 | 00 |
| 002DF720 | 00 | 00 | 03 | 80 | 36 | 00 | 01 | 00 | 04 | 80 | 2D | 20 | 11 | 00 | 26 | 79 |
| 002DF730 | 00 | 09 | 24 | 98 | 00 | 05 | DC | 6A | 05 | 80 | 1D | 00 | 00 | 01 | B0 | 03 | —150
| 002DF740 | 00 | 00 | 01 | B5 | 0E | CF | 00 | 00 | 01 | 00 | 00 | 00 | 01 | 20 | 00 | 84 | —1507
| 002DF750 | 40 | 25 | A8 | 50 | 20 | F0 | A3 | 1F | 06 | 01 | 02 | 00 | 00 | 19 | 90 | 73 | —1101 }1607
| 002DF760 | 74 | 74 | 73 | 00 | 00 | 00 | 00 | 00 | 00 | 03 | 30 | 00 | 00 | 00 | 01 | 00 | —1101
| 002DF770 | 00 | 00 | 0B | 00 | 00 | 00 | 01 | 00 | 00 | 00 | 0A | 00 | 00 | 00 | 01 | 00 |
| 002DF780 | 00 | 00 | 0B | 00 | 00 | 00 | 01 | 00 | 00 | 00 | 0A | 00 | 00 | 00 | 01 | 00 |
| 002DF790 | 00 | 00 | 0B | 00 | 00 | 00 | 01 | 00 | 00 | 00 | 0A | 00 | 00 | 00 | 01 | 00 |
| 002DF7A0 | 00 | 00 | 0B | 00 | 00 | 00 | 01 | 00 | 00 | 00 | 0A | 00 | 00 | 00 | 01 | 00 |
| 002DF7B0 | 00 | 00 | 0B | 00 | 00 | 00 | 01 | 00 | 00 | 00 | 0A | 00 | 00 | 00 | 01 | 00 |
| 002DF7C0 | 00 | 00 | 0B | 00 | 00 | 00 | 02 | 00 | 00 | 00 | 0A | 00 | 00 | 00 | 01 | 00 |

FIG. 11

| offset | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00040480 | 31 | 00 | 00 | 00 | 00 | 00 | 00 | 00 | 01 | 00 | 00 | 00 | 00 | 00 | 00 | 00 |
| 00040490 | 00 | 00 | 00 | 00 | 00 | 00 | 00 | 00 | 00 | 00 | B0 | 00 | 90 | 00 | 48 | 00 |
| 000404A0 | 00 | 00 | 48 | 00 | 00 | 00 | 00 | 00 | 00 | 00 | 01 | 00 | 90 | 00 | 48 | 00 |
| 000404B0 | 00 | 00 | 00 | 00 | 00 | 00 | 00 | 00 | 00 | 00 | 00 | 00 | 00 | 00 | 00 | 00 |
| 000404C0 | 00 | 00 | 00 | 00 | 00 | 00 | 00 | 00 | 00 | 00 | 00 | 00 | 18 | FF | FF | 00 |
| 000404D0 | 00 | 00 | 20 | 61 | 76 | 63 | 43 | 01 | 05 | 89 | C8 | FF | E1 | 00 | 08 | 67 |
| 000404E0 | 42 | 00 | 0B | E9 | 05 | 89 | C8 | 01 | 00 | 05 | 68 | CE | 01 | 0F | 20 | 00 |
| 000404F0 | 00 | 08 | D8 | 73 | 74 | 74 | 73 | 00 | 00 | 00 | 00 | 00 | 00 | 01 | 19 | 00 |
| 00040500 | 00 | 00 | 01 | 00 | 00 | 03 | 48 | 00 | 00 | 00 | 01 | 00 | 00 | 03 | FC | 00 |
| 00040510 | 00 | 00 | 01 | 00 | 00 | 03 | DE | 00 | 00 | 00 | 01 | 00 | 00 | 03 | DE | 00 |
| 00040520 | 00 | 00 | 01 | 00 | 00 | 03 | FC | 00 | 00 | 00 | 01 | 00 | 00 | 03 | DE | 00 |
| 00040530 | 00 | 00 | 01 | 00 | 00 | 03 | DE | 00 | 00 | 00 | 01 | 00 | 00 | 03 | FC | 00 |

FIG. 12

| offset | 0 | 1 | 2 | 3 | 4 | 5 | 6 | 7 | 8 | 9 | A | B | C | D | E | F | |
|---|---|---|---|---|---|---|---|---|---|---|---|---|---|---|---|---|---|
| 00000000 | 00 | 00 | 00 | 18 | 66 | 74 | 79 | 70 | 33 | 67 | 70 | 34 | 00 | 00 | 03 | 00 | |
| 00000010 | 33 | 67 | 70 | 34 | 33 | 67 | 70 | 36 | 00 | 00 | 00 | 08 | 77 | 69 | 64 | 65 | |
| 00000020 | 01 | 12 | 74 | 9D | 6D | 64 | 61 | 74 | 00 | 02 | 6B | 6D | 65 | B8 | 40 | 57 | —510 |
| 00026B90 | 26 | 35 | 5F | AC | 0B | 7A | 79 | 35 | F8 | 00 | 00 | EB | 83 | 41 | E2 | 20 | —520 |
| 00026BA0 | 31 | 50 | 1F | 41 | A0 | 40 | 15 | 85 | 20 | AC | C2 | A3 | 90 | 00 | 9B | 92 | |
| 00035720 | 00 | 00 | E5 | B2 | 41 | B4 | 40 | 16 | 55 | 02 | 32 | 02 | 38 | 46 | 4F | 1E | |
| 00035730 | B3 | 74 | D2 | BA | 3E | 04 | 70 | C8 | C1 | A1 | 37 | 8A | B0 | BC | A5 | B0 | |
| 00043CA0 | C3 | 94 | AA | EA | D6 | 60 | 00 | 00 | C9 | B8 | 41 | E6 | 60 | 16 | 54 | 09 | |
| 00043CB0 | 03 | 81 | 00 | C8 | B9 | F0 | 57 | 6F | 17 | E8 | 1D | 8E | 1C | 13 | 18 | 34 | |
| 00050660 | E8 | DF | 00 | 00 | BB | F2 | 41 | E8 | 80 | 16 | 56 | 1A | 04 | A1 | 70 | 62 | |
| 00050670 | 09 | E7 | FB | 6F | 15 | B8 | 3A | 7D | F8 | 4E | 30 | 68 | 53 | 73 | 23 | E9 | |
| 0005C250 | BD | 63 | BC | FB | 86 | F1 | A7 | C0 | 00 | 00 | BB | 5A | 41 | EA | A0 | 16 | |
| 0005C260 | 58 | 27 | 0F | 02 | 68 | 28 | BE | DB | 2F | 80 | E4 | 3B | 0D | B6 | D9 | 9B | |
| 00067DB0 | 99 | 0B | C7 | 71 | DD | F0 | 00 | 00 | B6 | 1C | 41 | EC | C0 | 16 | 56 | 04 | |
| 00067DC0 | E0 | 66 | 08 | 41 | 20 | 2D | 9B | 33 | 75 | 6E | 68 | FD | 86 | 63 | 40 | 0A | |
| 000733D0 | 1E | 56 | 1C | 38 | 65 | 30 | 00 | 00 | BD | CD | 41 | EE | E0 | 16 | 56 | 14 | |
| 000733E0 | 20 | 23 | 28 | 52 | A4 | FC | E3 | 39 | 09 | 7C | E7 | 82 | D7 | CE | AC | D8 | |
| 0007F1A0 | FF | 74 | 77 | 93 | 92 | 59 | B6 | 00 | 00 | BE | F6 | 41 | F1 | 00 | 16 | 58 | |
| 0007F1B0 | D0 | 2E | 0C | 8F | 67 | C5 | 29 | AB | 4D | B7 | 8E | B4 | 52 | 26 | DF | B6 | |

| Symbol | Code |
|--------|------|
| A | 1 |
| B | 011 |
| C | 010 |
| D | 0011 |

0111010001101100 10....
B A C   D   B   ?

METHOD FOR CODEC-BASED RECOVERY OF A VIDEO USING A CLUSTER SEARCH

TECHNICAL FIELD

This invention involves a method for codec-based recovery of videos using a cluster search; in more detail, the invention involves a code-based video recovery method combining the video's decoding data and non-overwritten video frames, and a cluster search-based video recovery method which uses index data that can be gained during the recovery of video frames if at least some fragmented video data is partially left on the storage medium, using these to recover a single video frame, and the recording medium thereof.

BACKGROUND ART

Normally, to record a file on a storage medium (10A), as shown in FIG. 1, the file system area (11A) includes data size, starting location, and file fragment information, etc. and the actual data is stored in the data area (13A).

If the actual data of the file stored in the storage medium (10A) is divided over clusters 3, 4, 21 and 30 of the data region (13A), the operating system acquires file information from the file system area (11A) to read the file stored on the storage medium, and by reading the clusters in the order 3→4→21→30, can load the file.

If the file saved on the storage medium (10A) is deleted, the actual data stored on the data region (13A) is not erased; instead, the file is treated as deleted by deleting 1 byte of the file data from the file system region (11A).

Therefore, although the file has been deleted, if the file system region (11A) has not been overwritten with different data, and the data area (13A) has not been overwritten with a different data either, recovery of the deleted file by loading the file using the same method for files whose operating system has not been deleted is possible.

However, there was the problem that if the file system area (11A) or data area (13A) where the deleted file was is overwritten with different data, the deleted file could not be recovered.

Also, in the case of video files, they are stored in fragments due to their large size, and in the course of usage of the storage medium (10A) after their deletion, parts of the video data are overwritten in many cases, and there is a high tendency of data loss due to the large space used by the file system region (11A) and data region (13A). Therefore, data could not be recovered when recovering data using file system information.

DISCLOSURE OF INVENTION

Technical Problem

The objective of the invention, devised to resolve the problems recited above, provides a codec-based video recovery method, which recovers images by combining and decoding information and the non-overwritten video frames, and connects the recovered images to recover video, even in cases where a video file is fragmented and data is partially overwritten.

The other objective of the invention is to provide a cluster search-based video recovery method wherein fragmented video data is joined to recover a single image frame, based on the index data that can be gained in the process of recovering these frames, if fragmented video data is at least partially left on the storage medium.

Solution to Problem

The codec-based video recovery method of the invention for the accomplishment of the recited objectives includes a cluster extraction step wherein free cluster regions are extracted; the region extraction step where the free cluster region extracted in the cluster extraction step is used to extract the M frame region, consisting of frames coded with the MPEG-4 visual codec, and the M decoding region, consisting of MPEG-4 visual decoding data; the interconnection step where the M frame region and M decoding region extracted in the region extraction step; and the recovery step, wherein the M frame region and M decoding regions arranged in the interconnection step are decoded and the video is recovered.

In the region extraction step, the region from the M frame type code "0x000001B6" to before the first start code "0x000001" is extracted as the M frame region; and the region until before the first start code "0x000001" including the sequence type code "0x000001B0," the visual type code "0x000001B5," and one of the video type codes "0x00000100" and "0x0000011F," and one of the layer type codes "0x00000120" and "0x0000012F" can be extracted as the M decoding region.

The codec-based video recovery method of the invention for the accomplishment of the recited objectives includes a cluster extraction step wherein free cluster regions are extracted from the storage device; the region extraction step where the free cluster is used to extract the H decoding region, which comprises of H.264 decoding information, and the H frame region, which comprises frames coded with the H.264 codec; the interconnection step where the H frame region and H decoding region extracted in the region extraction step are interconnected and arranged; and the recovery step wherein the H frame region and H decoding regions arranged in the interconnection step are decoded and the video is recovered.

In the region extraction step, the SPS region, which is formed "0X00XX" away from "0X67" of the SPS type code "0X00XX67," and the PPS region, which is formed "0X00XY" away from "0x68" of the PPS type code "0X00XY68," are extracted to the H decoding region; and the region formed "0X00XXXYXZ" away from "0x65" of the H frame type code "0X00XXXYXZ65" can be extracted as the H frame region.

The H frame region can be extracted by moving "0X00XXXXYXZ" away from "0x65" at "0X00XXXYXZ65," which is the H frame type code, and extracting the region extending until the H partial frame type code "0X0000XXXY41" or "0x0000XXXY61."

In the region extraction step, if the SPS code "0x67" exists after the second start code "0x00000001," the region between the SPS code to the second start code is extracted to the SPS region, and, if the PPS code "0x68" exists after the second start code "0x00000001," the region between the PPS code to the second start code is extracted to the PPS region and extracted to the H decoding region; if the H frame code "0x65" exists after the second start code "0x00000001," the region from the H frame code until the second start code can be extracted as the H frame region.

In the recovery step, still images are recovered and the images may be connected and recovered as video.

The cluster search-based video recovery method of this invention comprises the decoding step, where the clusters of the storage medium are decoded to generate at least one cluster group including independent frames; the index data search step where the clusters of the storage medium are decoded to search for at least 1 index data; and the image frame formation step wherein one cluster group included in the index data among the cluster group generated through the decoding step is formed as an image frame or multiple cluster groups are connected to form an image frame.

In the image frame formation step, a reference cluster where independent frame data is included in the index data is detected from among the cluster group generated through the decoding step, then a linking cluster group, excluding the reference cluster group, where independent frame data is included in the index data, is detected, and, by linking the reference cluster group and linking cluster group an image frame is formed.

In the decoding step, if an error occurs during decoding of a cluster, decoding can be resumed from the subsequent frame.

The decoding step can comprise of a saving step where the decoded frame and the temporary index data of each frame is saved.

The image frame forming step can include a repeat decoding step where decoding is repeated from the last frame of the reference cluster group, after linking the reference cluster group and the linking cluster group.

The repeat decoding step may include an expansion step, where, in the case that an error occurs during decoding, the cluster is expanded between the reference cluster group and linking cluster group, enabling decoding.

Regarding the size of the cluster that can be, expanded in the expanding step, the sum of the size of the last frame that was not normally decoded in the reference cluster group, the size of the first frame not normally decided in the linking cluster group, and the size to be expanded between the reference cluster group and linking cluster group, may be less than or equal to the size of the last frame when normally decoded from the reference cluster group.

The image frame forming step can link all reference cluster groups and linking cluster groups, then join their index data to generate a complete image.

The decoding step may follow the index data search step.

The index data search step may include a detection step where, if index data cannot be found, arbitrary cluster groups among those cluster groups generated through the decoding step are each linked to a reference cluster group, after which decoding is performed to detect the cluster groups where decoding proceeds normally as linking cluster groups.

The detection step performs decoding by expanding clusters between the reference cluster group and arbitrary cluster groups until normal decoding is performed, and the size of the expandable clusters can be decided by comparing the sizes of the last frame not normally decoded in the reference cluster group, the first frame not normally decoded in the linking cluster group and the frame with the largest size among the frames recovered so far.

Advantageous Effects of Invention

As described above, the codec-based video recovery method of this invention combines decoding information and image frames not written over even when the video file is fragmented and data is partially overwritten, and links the recovered images into a recovered video.

The cluster search-based video recovery method according to the other embodiment of this invention searches for the order of fragmented video data based on index data that can be gained in the recovery of image frames, linking them to create a single image frame, if even partial fragmented video data is stored on the storage medium.

BRIEF DESCRIPTION OF DRAWINGS

FIG. 4 is an example drawing made to describe the process wherein the decoding region is extracted in the codec-based video recovery method according to the first embodiment of this invention;

FIG. 11 is an example drawing drawn to describe the process wherein the decoding region is extracted in the codec-based video recovery method according to the second embodiment of this invention;

FIG. 12 is an example drawing made to describe the process wherein the frame region is extracted in the codec-based video recovery method according to the second embodiment of this invention;

MODE FOR CARRYING OUT THE INVENTION

In the following, drawings of the invention including desirable embodiments are referenced in a detailed description to facilitate implementation by a person with general knowledge in the technical field to which this invention belongs.

Figure 1:
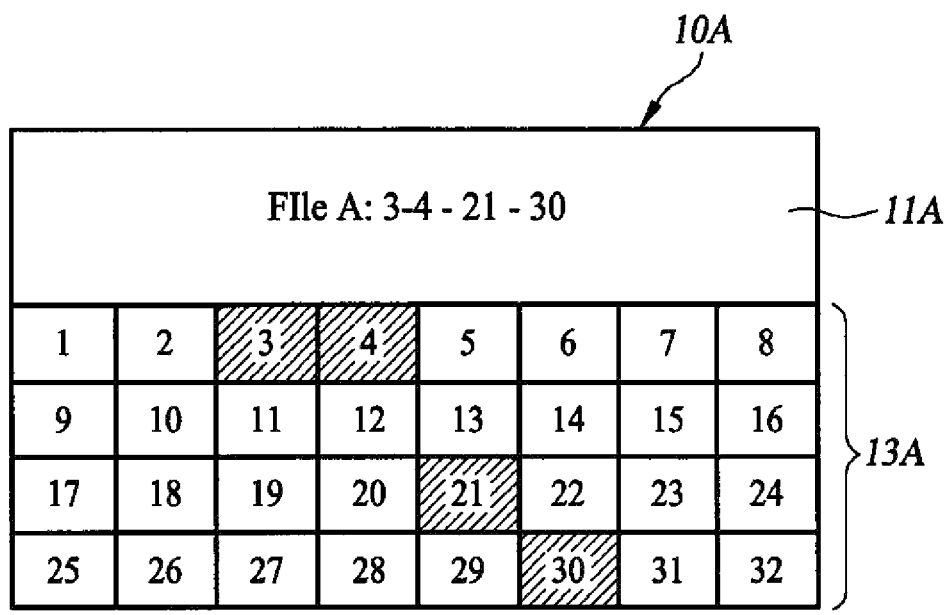
FIG. 1 is an example drawing drawn to explain common file recovery methods.
Figure 2:
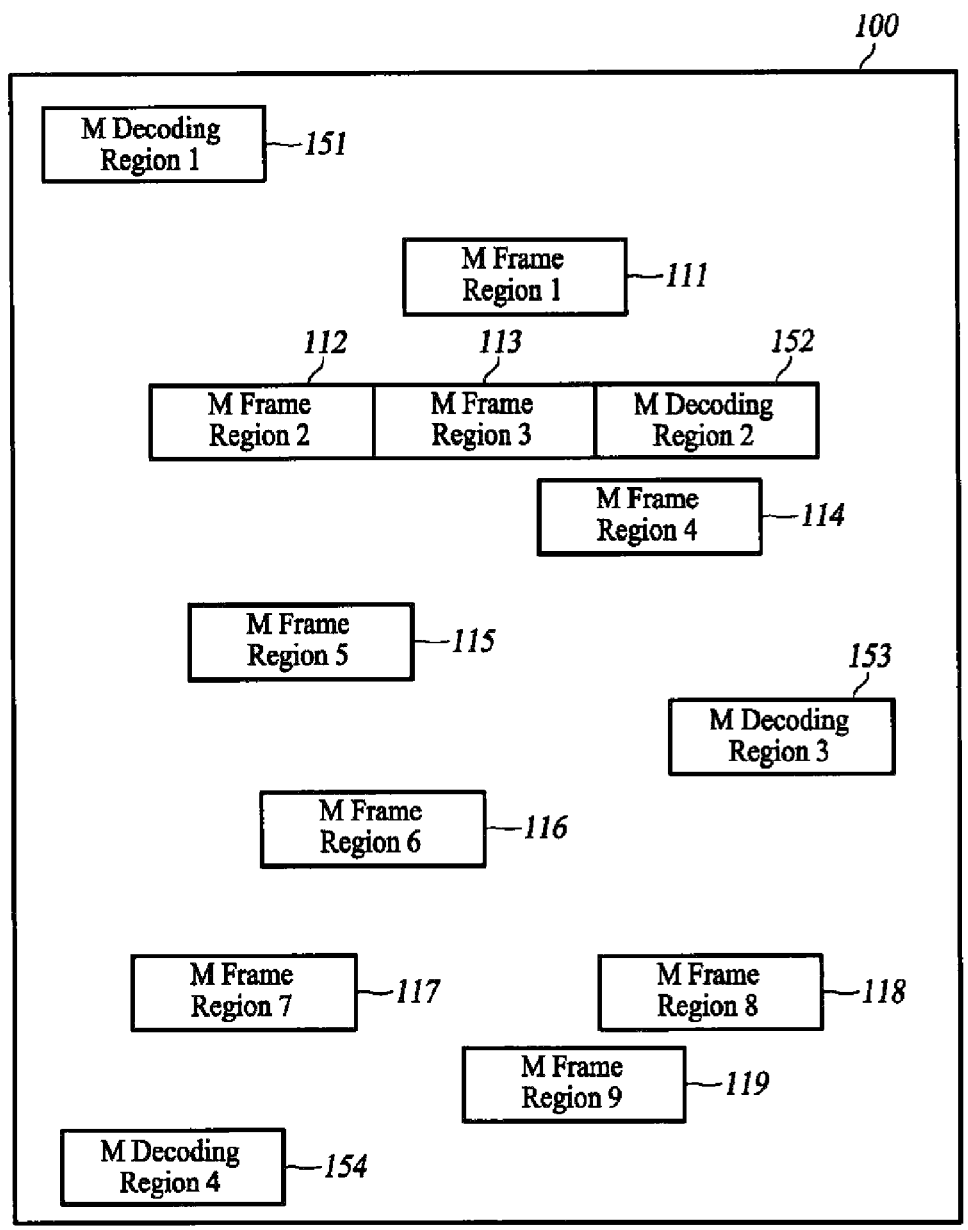
FIG. 2 is a block diagram of the inside of a free cluster to describe the code-based video recovery method according to the first embodiment of this invention.
Figure 3:
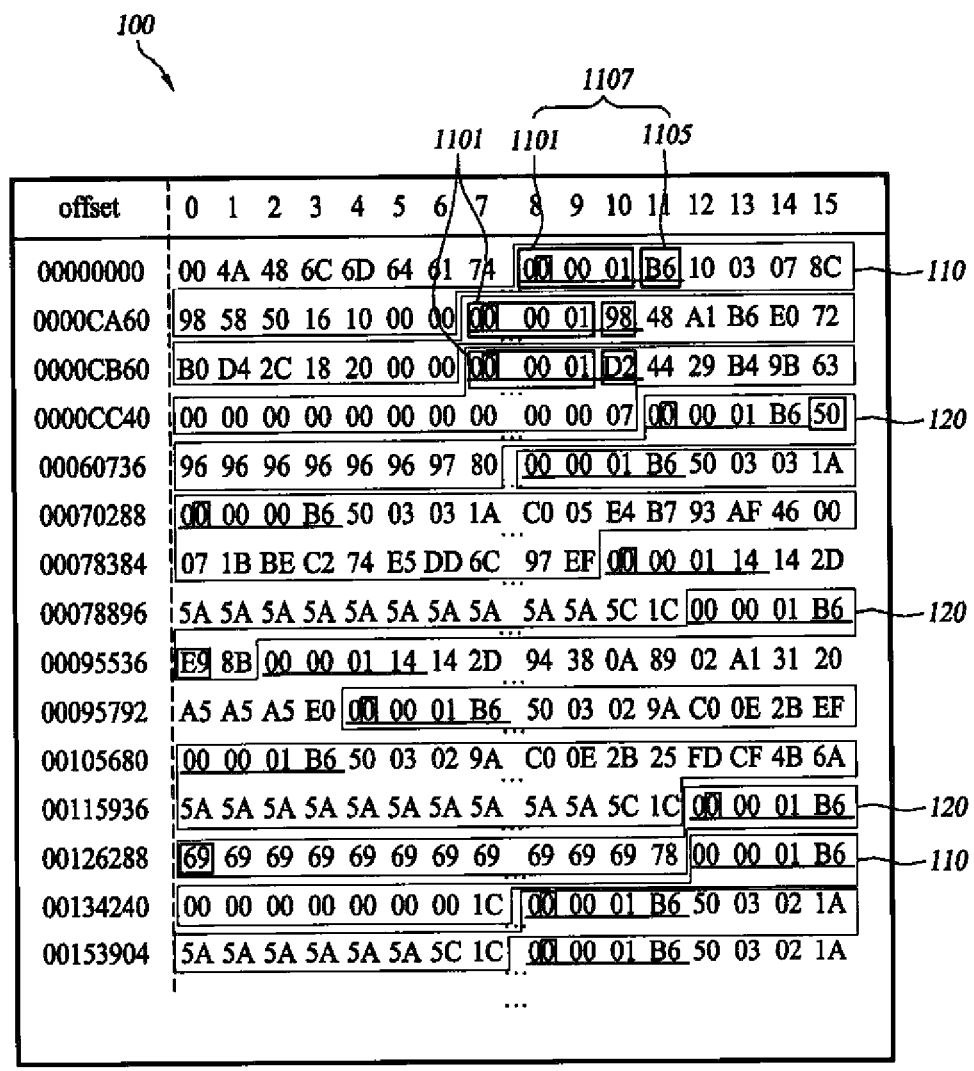
FIG. 3 is an example drawing drawn to explain the process wherein the frame region is extracted in the codec-based video recovery method according to the first embodiment of this invention.
Figure 5:
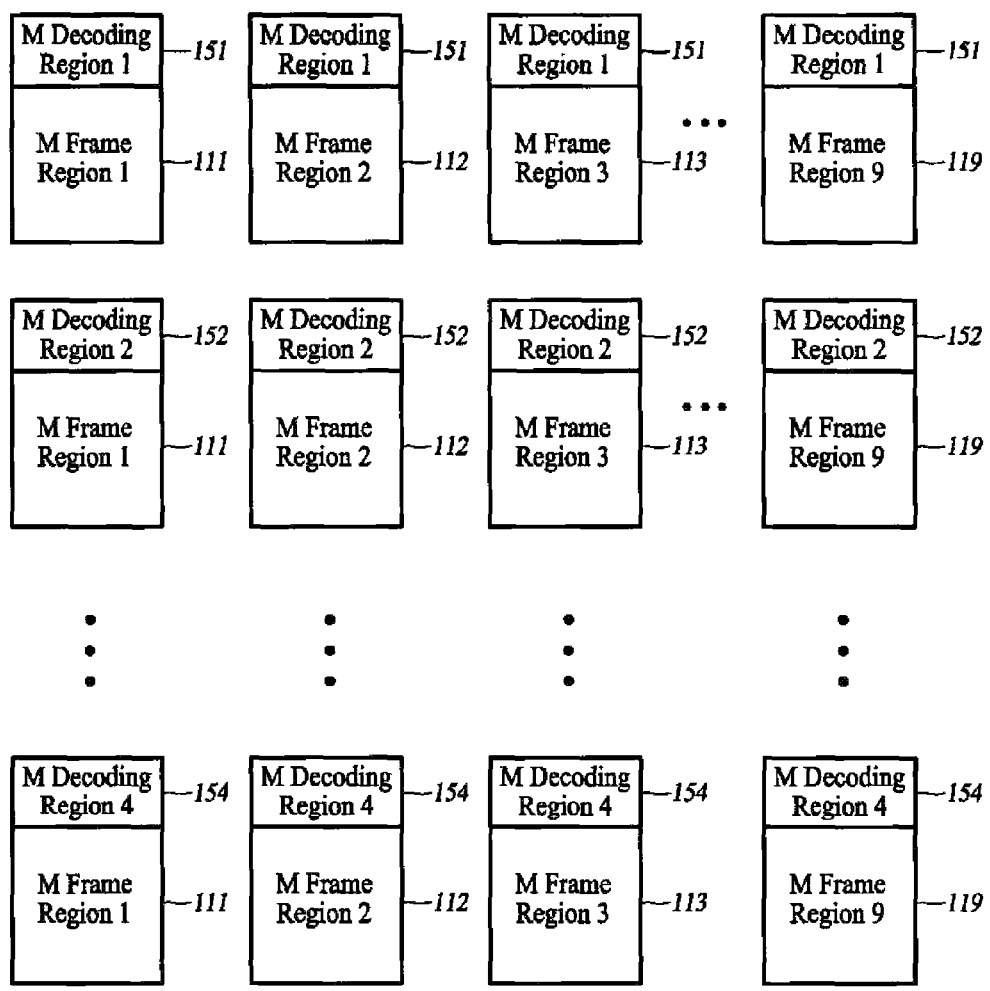
FIGS. 5 and 6 are example drawings drawn to describe the process wherein the decoding regions and frame regions are combined to recover the image in the codec-based video recovery method according to the first embodiment of this invention.
Figure 6:
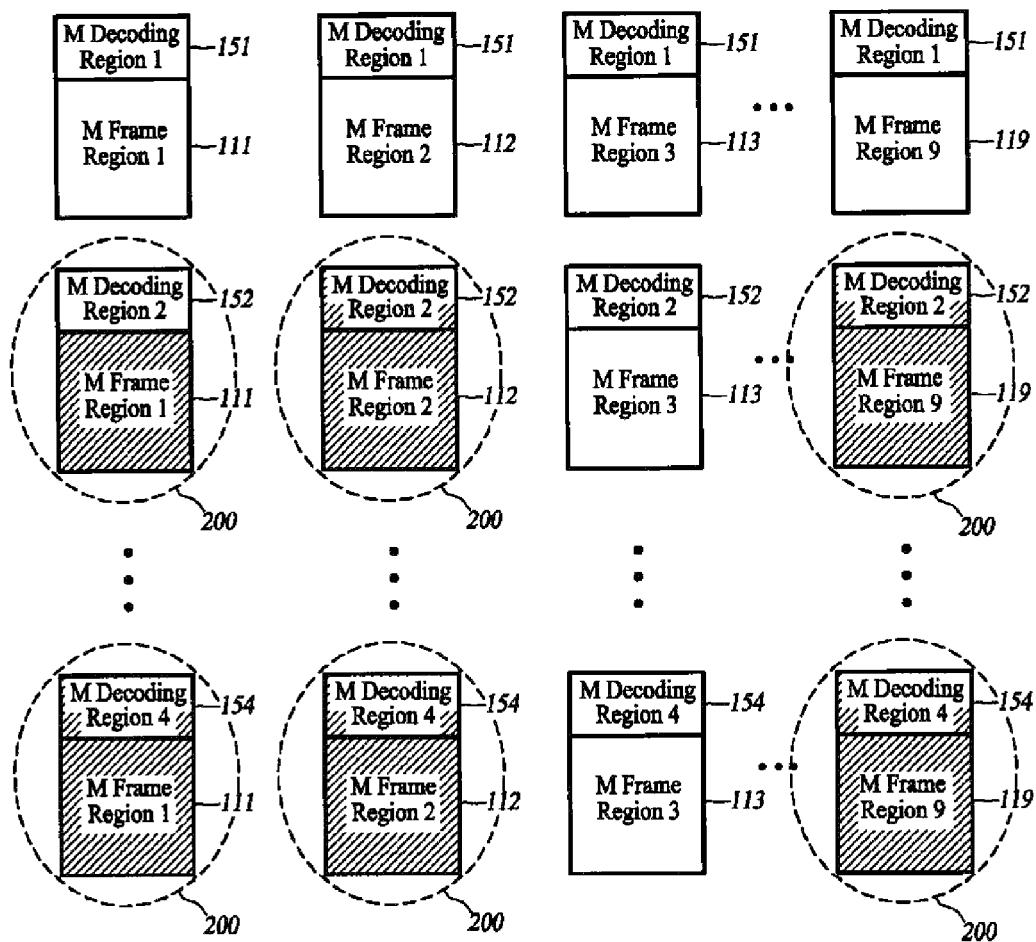
Figure 7:
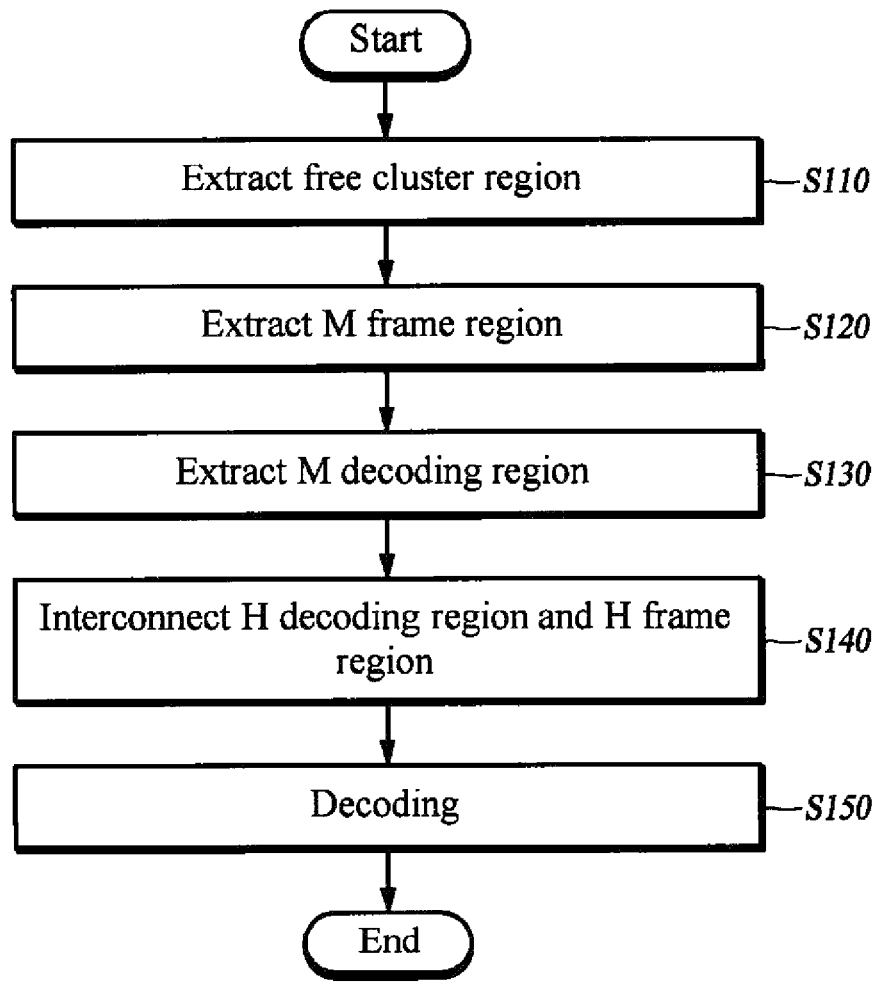
FIG. 7 is a flowchart showing the codec-based video recovery method, according to the first embodiment of this invention.
Figure 8:
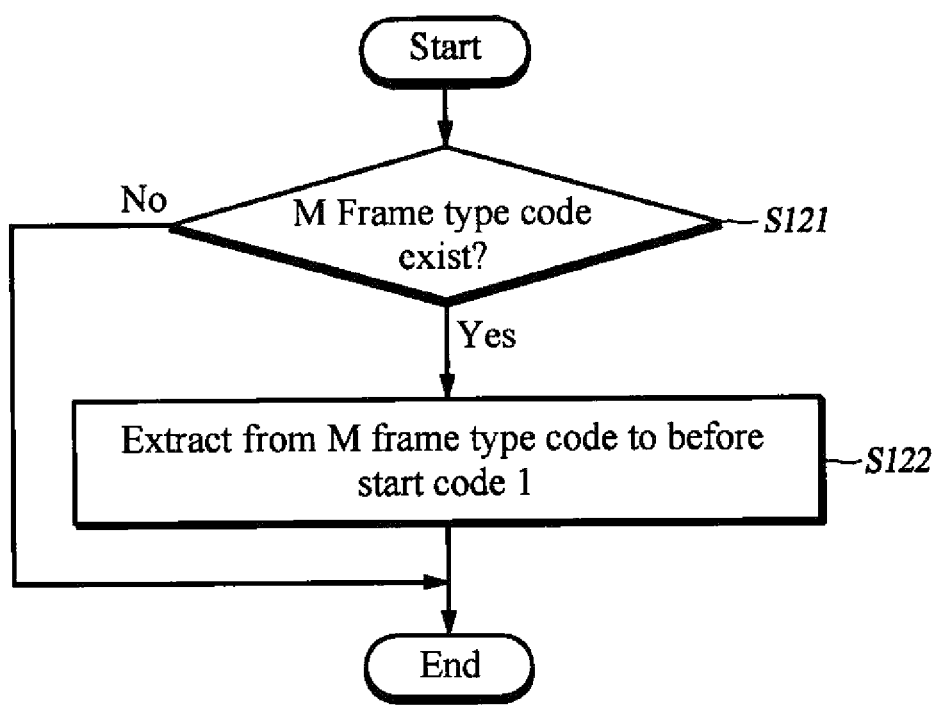
FIG. 8 is a flowchart showing the M frame extraction process in the codec-based video recovery method according to the first embodiment of this invention.
Figure 9:
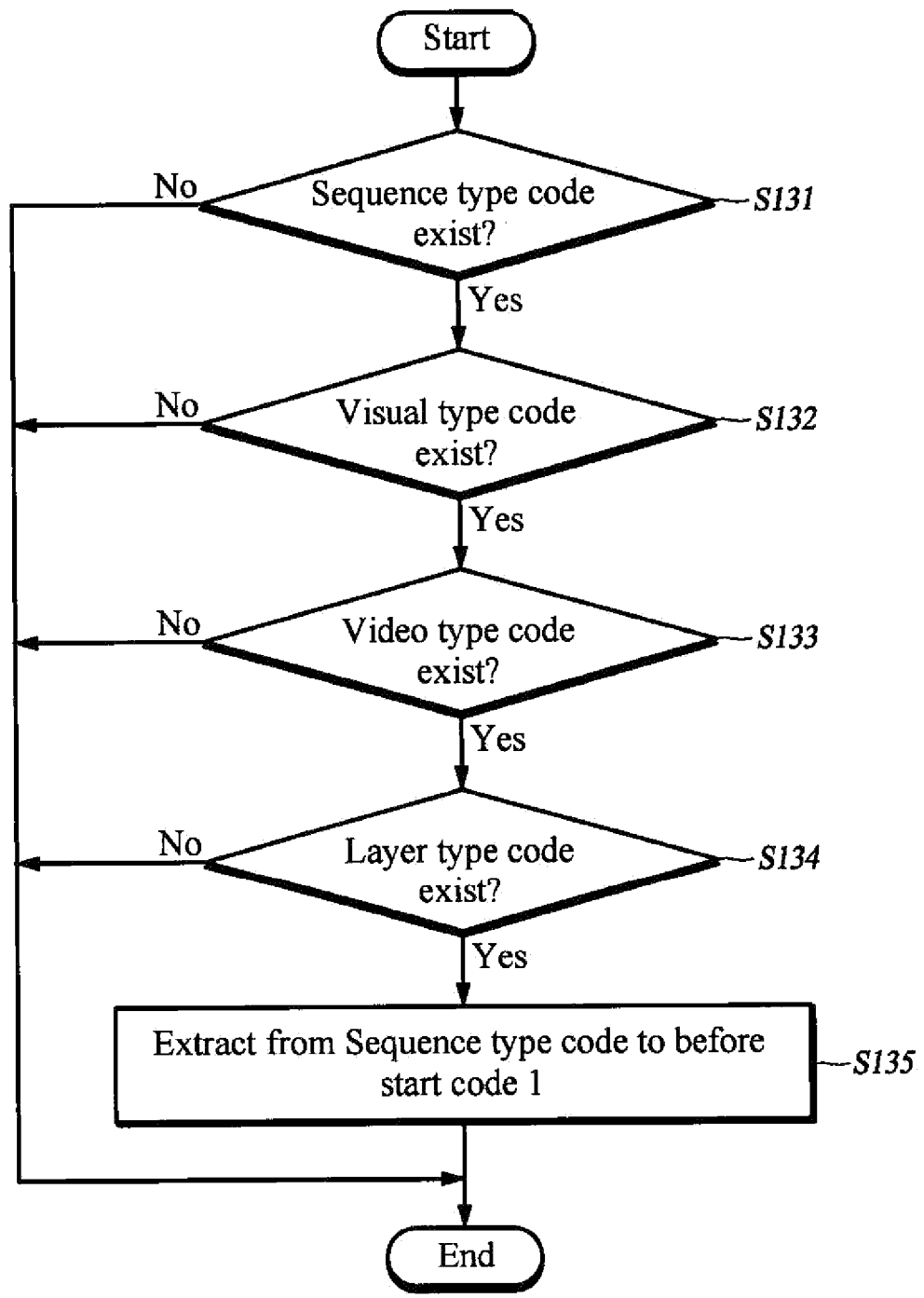
FIG. 9 is a flowchart showing the M decoding extraction process in the codec-based video recovery method according to the first embodiment of this invention.

FIG. 2 is a block diagram of the inside of a free cluster to describe the code-based video recovery method according to the first embodiment of this invention; FIG. 3 is an example drawing drawn to explain the process wherein the frame region is extracted in the codec-based video recovery method according to the first embodiment of this invention; FIG. 4 is an example drawing made to describe the process wherein the decoding region is extracted in the codec-based video recovery method according to the first embodiment of this invention; FIGS. 5 and 6 are example drawings drawn to describe the process wherein the decoding regions and frame regions are combined to recover the image in the codec-based video recovery method according to the first embodiment of this invention; FIG. 7 is a flowchart showing the codec-based video recovery method according to the first embodiment of this invention; FIG. 8 is a flowchart showing the M frame extraction process in the codec-based video recovery method according to the first embodiment of this invention; FIG. 9 is a flowchart showing the M decoding extraction process in the codec-based video recovery method according to the first embodiment of this invention.

The codec-based video recovery method according to the first embodiment of this invention uses the MPEG-4 visual codec to recover stored videos. The MPEG-4 codec is used to record video files in various DVR, automobile black boxes and general mobile phones.

Generally, in videos, to increase compression rate, only the parts that differ from the previous or subsequent frame are recorded, and those parts that do not differ are displayed by referencing the preceding or following frames.

However, in this case, an error in a single frame can lead to consecutive errors in the following frames, thus every certain number of frames, an intra-frame (i-frame) is inserted. The i-frame does not reference the preceding and subsequent frames, and records all image information.

In the first embodiment of this invention, an intra-frame recorded by coding with the MPEG-4 visual codec is referred to as the "M frame," and the MPEG-4 visual decoding data for the decoding of the M frame is referred to as "M decoding."

Because the video data stored on the storage medium has a large size, despite much data having been overwritten during usage after deletion of the file, at the level of the frames composing the video, at least a few frames have a high probability of remaining on the medium without being deleted.

The size of the decoding data is very small compared to the video data.

When data is deleted from the storage medium, the deleted data is moved to a free cluster (100). The free cluster (100) is empty space allocated as free by the operating system.

Therefore, to recover the deleted file from the storage medium, the free cluster (100) region is first extracted (Step S110).

In the free cluster (100) are the M frame region (110) assumed to be a frame having been coded and recorded with the MPEG-4 visual codec, and the M decoding region (150) assumed to be MPEG-4 visual decoding data.

The M frame region (110) and M decoding region (150) in the free cluster (100) may exist as single or multiple fragments.

In the invention, the M frame region (110), as drawn in FIG. 2, is shown as frame region 1 (111), frame region 2 (112), frame region 3 (113), frame region 4 (114), frame region 5 (115), frame region 6 (116), frame region 7 (117), frame region 8 (118) and frame region 9 (119).

The M decoding region (15), as drawn in FIG. 2, is shown as M decoding region 1 (151), M decoding region 2 (152), M decoding region 3 (153), and M decoding region 4 (154).

To extract the M frame region (110) from the free cluster (100), as drawn in FIG. 3, the M frame type code (1107) indicating the M frame, "0x000001B6" is found (Step S121).

In the M frame type code (1107), "0x000001" is start code 1 (1101) which denotes a video coded using the MPEG-4 visual codec, and "0xB6" is the M frame code (1105) which denotes the beginning of the M frame.

If in the free cluster (100) "0x000001B6," which is the M frame type code (1107), has been found, the leading 2 bits of the byte following the M frame type code (1107) are checked to confirm they are the binary number "00."

Therefore, as drawn in FIG. 3, the byte after the M frame type code (1107), "0x000001B6," is "0x10," and, expressed in binary numbers, this is "0001 0000," making the first two bits "00."

Next, selecting and extracting the region from after "0x000001B6," which is the M frame type code (1107), to start code 1 (1101), "0x000001," (Step S122), one M frame region (110) is extracted (Step S120).

Repeating in this manner, selecting and extracting the region from after "0x000001B6," which is the M frame type code (1107), to start code 1 (1101), "0x000001," for the entire free cluster (100) region, each M frame region (110) coded and recorded with the MPEG-4 visual codec can be extracted.

Meanwhile, if the first two bits of the byte following the M frame type code (1107) "0x000001B6" are not "00," this is not an M frame region (110), but falls under the category of M partial frame region (120). In an M partial frame region (120), in order to increase video compression, only the parts differing from the previous M frame region (110) or subsequent M frame region (110) are recorded.

Therefore, as drawn in FIG. 3, if the byte following "0x000001B6" includes "0x50" or "0xE9," which can be expressed as "01010000" and "11101001" respectively, the first two bits are not "00," therefore regions where the byte following "0x000001B6" includes "0x50" or "0xE9" are M partial frame regions (120).

Also, if start code 1 (1101) "0x00001," which denotes a video coded with the MPEG-4 visual codec, exists, but the next byte has a code other than "0xB6," it is not image data but a different kind of data.

Therefore, as drawn in Diagram 3, regions beginning with "0x00000198," and regions beginning with "0x000001D2," etc., are not image data, but other kinds of data.

To extract the M decoding region (150) from the free cluster (100), as drawn in FIG. 4, a search for the sequence type code (1601) "0x000001B0" which comprises start code 1 (1101) "0x000001" and the sequence code (1501) "0xB0," (Step S131), the visual type code (1603) "0x000001B5" which comprises start code 1 (1101) "0x00001" and the visual code (1503) "0xB5," (Step S132), the video type code (1605) which comprises start code 1 (1101) "0x000001" and either of the video codes (1501) "0x00" or "0x1F," (Step S133), and the layer type code (1607) comprising start code 1 (1101) "0x00001" and one of the layer type codes "20" or "2F" (Step S134) is performed.

As the video code (1501) may comprise either "0x00" or "0x1F," the video type code (1605) can be either "0x00000100" or "0x0000011F."

As the layer type code (1607) may comprise, either "20" or "2F," the layer type code (1607) can either be "0x00000120" or "0x0000012F."

Accordingly, if the sequence type code (1601), the visual type code (1603), the video type code (1605) and the layer type code (1607) exist, the region from the sequence type code (1601) above, "0x000001B0," to start code 1 (1101), "0x000001," is selected and extracted (S135), and thereby one M decoding region (150) is extracted (Step S130).

Repeating this way, selecting and extracting the region from after "0x000001B0," which is the sequence type code (1601), to start code 1 (1101), "0x000001," for the entire free cluster (100) region, Each M decoding region (150) presumed to be MPEG-4 visual decoding data can be extracted.

As recited above, after extracting multiple M frame regions (110) and M decoding regions (150), as drawn in FIG. 5, the multiple M frame regions (110) and multiple M decoding regions (150) are interconnected to form an MPEG-4 visual bit stream that can be decoded with the MPEG-4 visual decoder (Step S140).

In this invention, the M frame region (110) is, shown as M frame region 1 (111) or M frame region 9 (119), and the M decoding region (150) is shown as M decoding region 1 (151) or M decoding region 4 (154), allowing a total of 36 different cases of bit streams resulting from the interconnection of M frame regions (110) and M decoding regions (150).

Next, decoding the bit stream with the decoder, as drawn in FIG. 6, bit streams for which decoding is successful generate a recovered image (200) (Step S150), and data is not generated for bit streams for which decoding fails.

The recovered image (200) is a still image, therefore by visually inspecting the connectivity of individual still image, the video can be recovered by connecting still images to still images.

Meanwhile, using just the M partial frame region (120) extracted in FIG. 3, even if individual frame decoding is successful, this is meaningless without information on the previous and subsequent frames.

However, if the previous sand subsequent frames for an M partial frame region (120) are M frame regions (110) recovered as complete still images, the M partial frame region (120), if located M frame region (110) and M frame region (110), with connectivity, can be decoded and recovered as a complete still image.

Therefore, while a difference image recovered using just an M partial frame region (120) is meaningless even if decoding thereof is successful, if there is connectivity from a complete recovered still image, the difference image can also be recovered as a complete still image.

Figure 10:
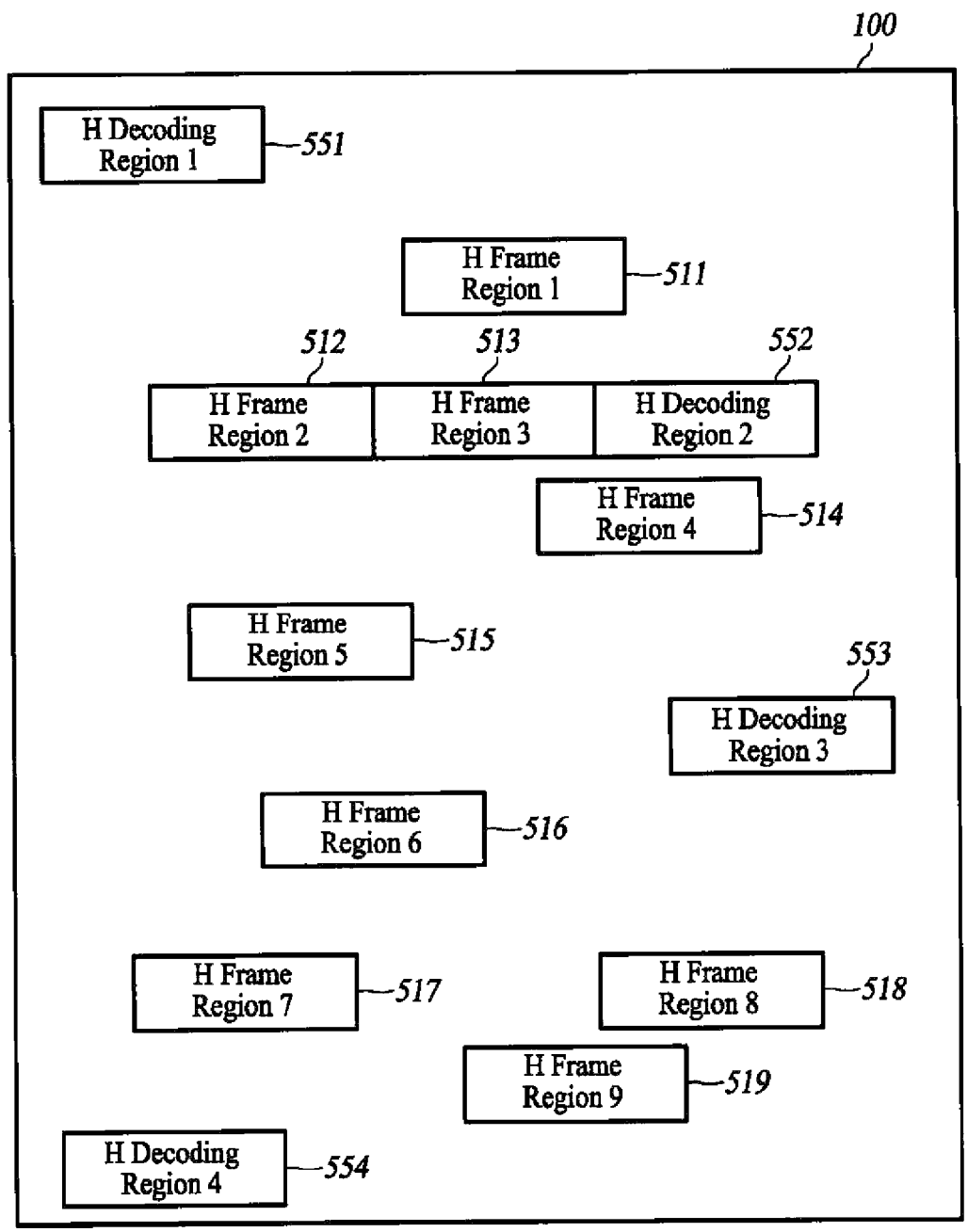
FIG. 10 is a block diagram of the inside of the free cluster to describe the codec-based video recovery method according to the second embodiment of this invention.
Figure 13:
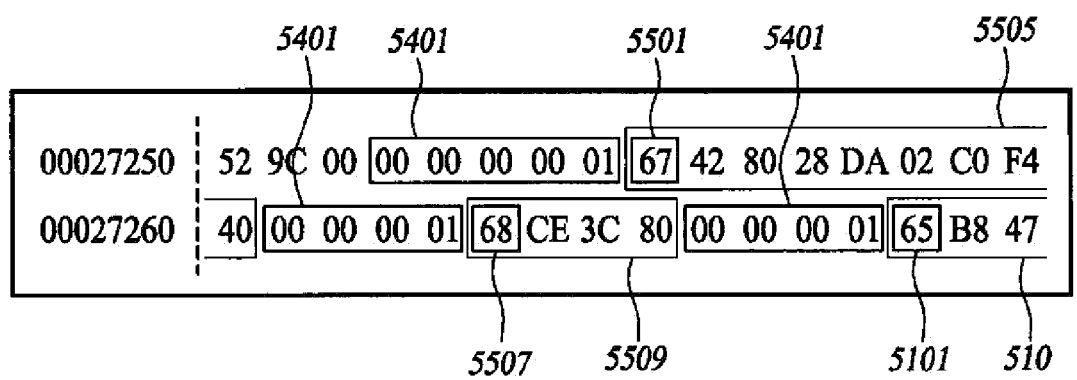
FIG. 13 is an example drawing drawn to describe the process of decoding region extraction and another process for frame region extraction in the codec-based video recovery method according to the second embodiment of this invention.
Figure 14:
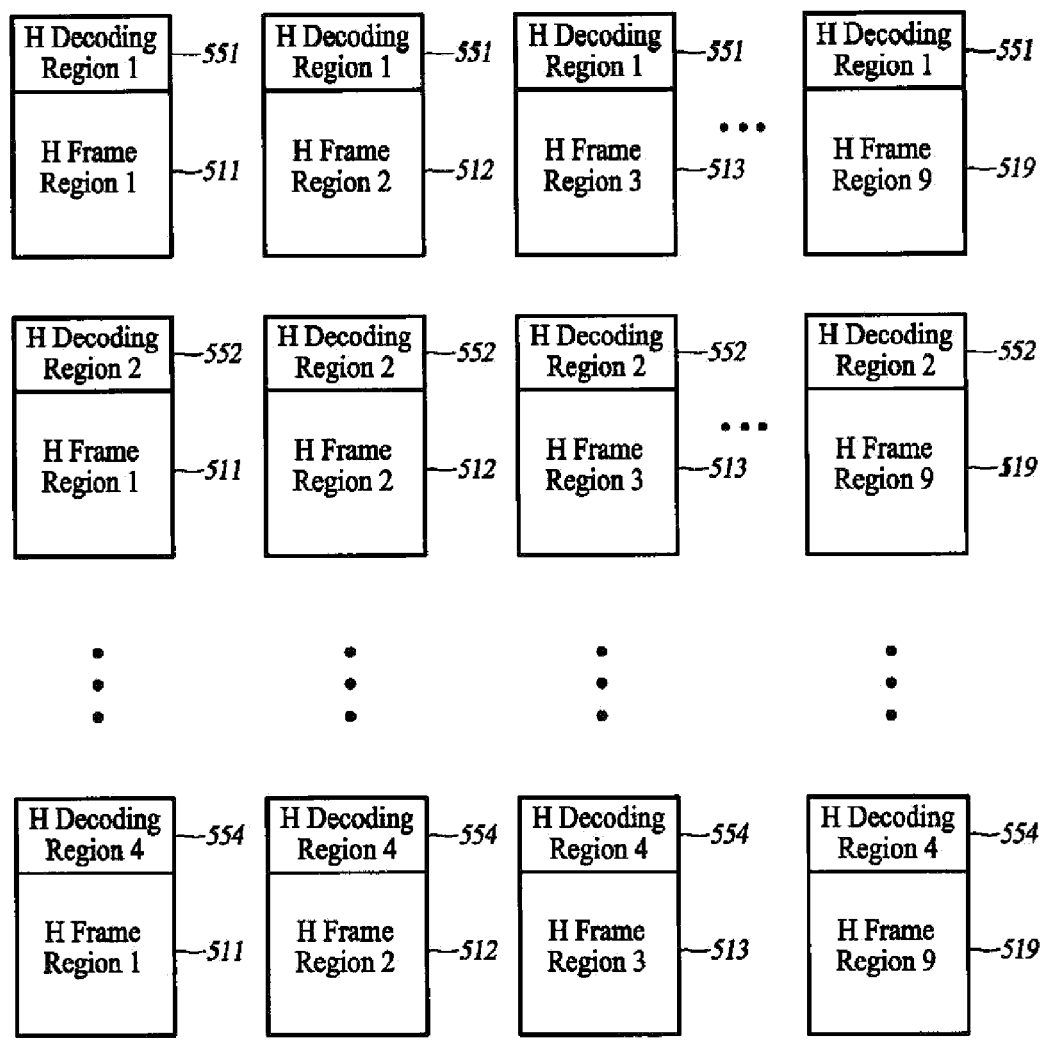
FIGS. 14 and 15 are example drawings made to describe the process wherein the decoding regions and frame regions are combined to recover the image in the codec-based video recovery method according to the second embodiment of this invention.
Figure 15:
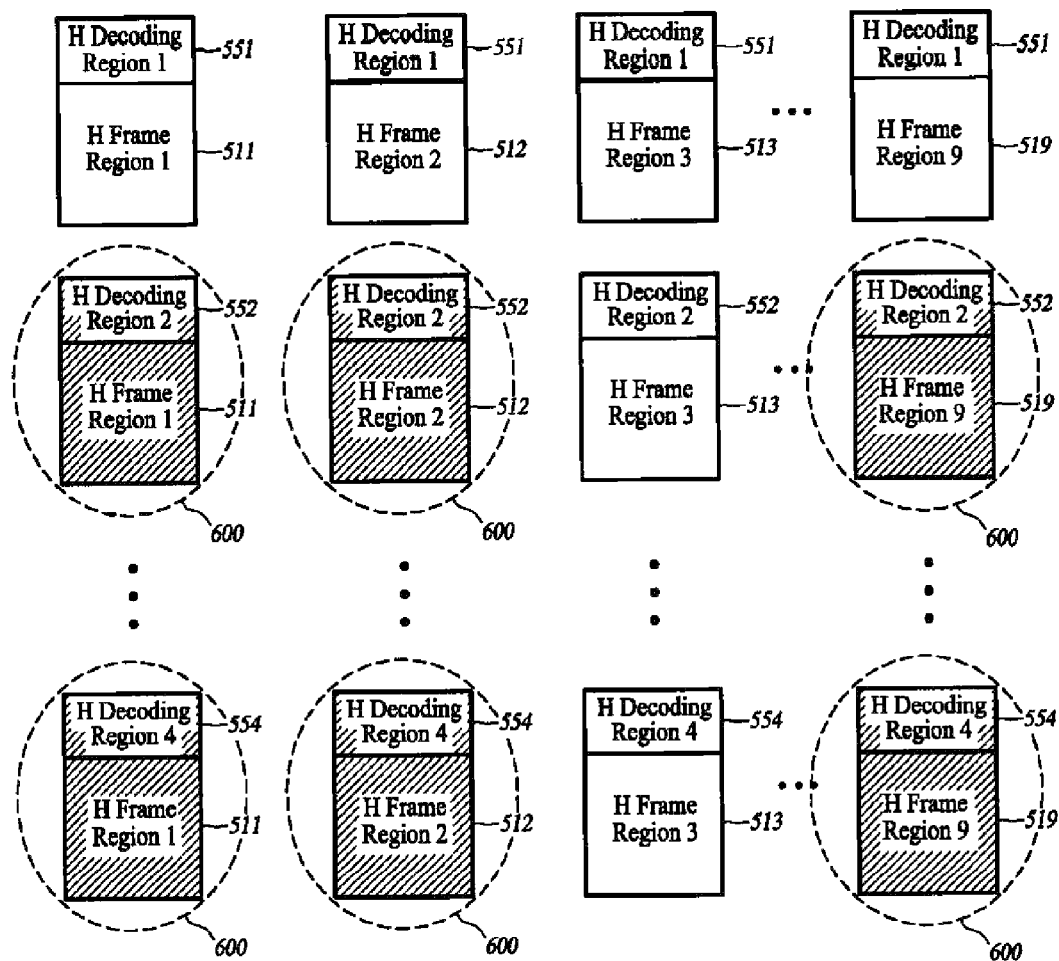
Figure 16:
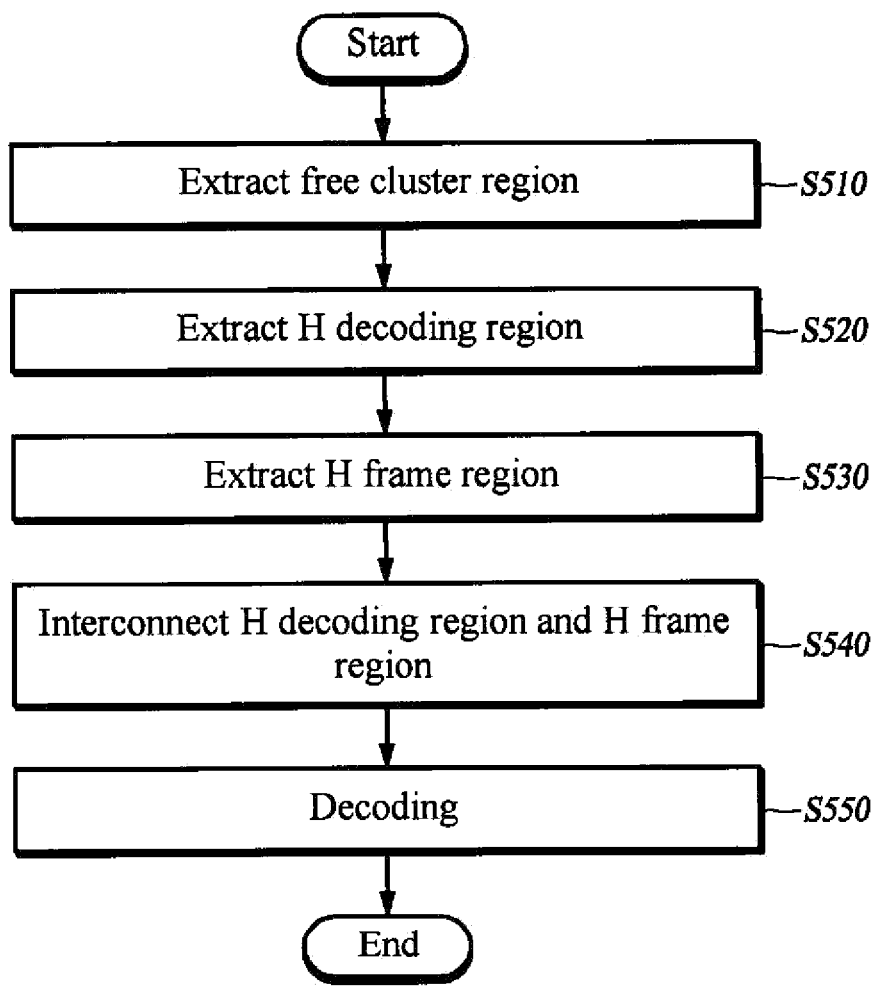
FIG. 16 is a flowchart showing the codec-based video recovery method according to the second embodiment of this invention.
Figure 17:
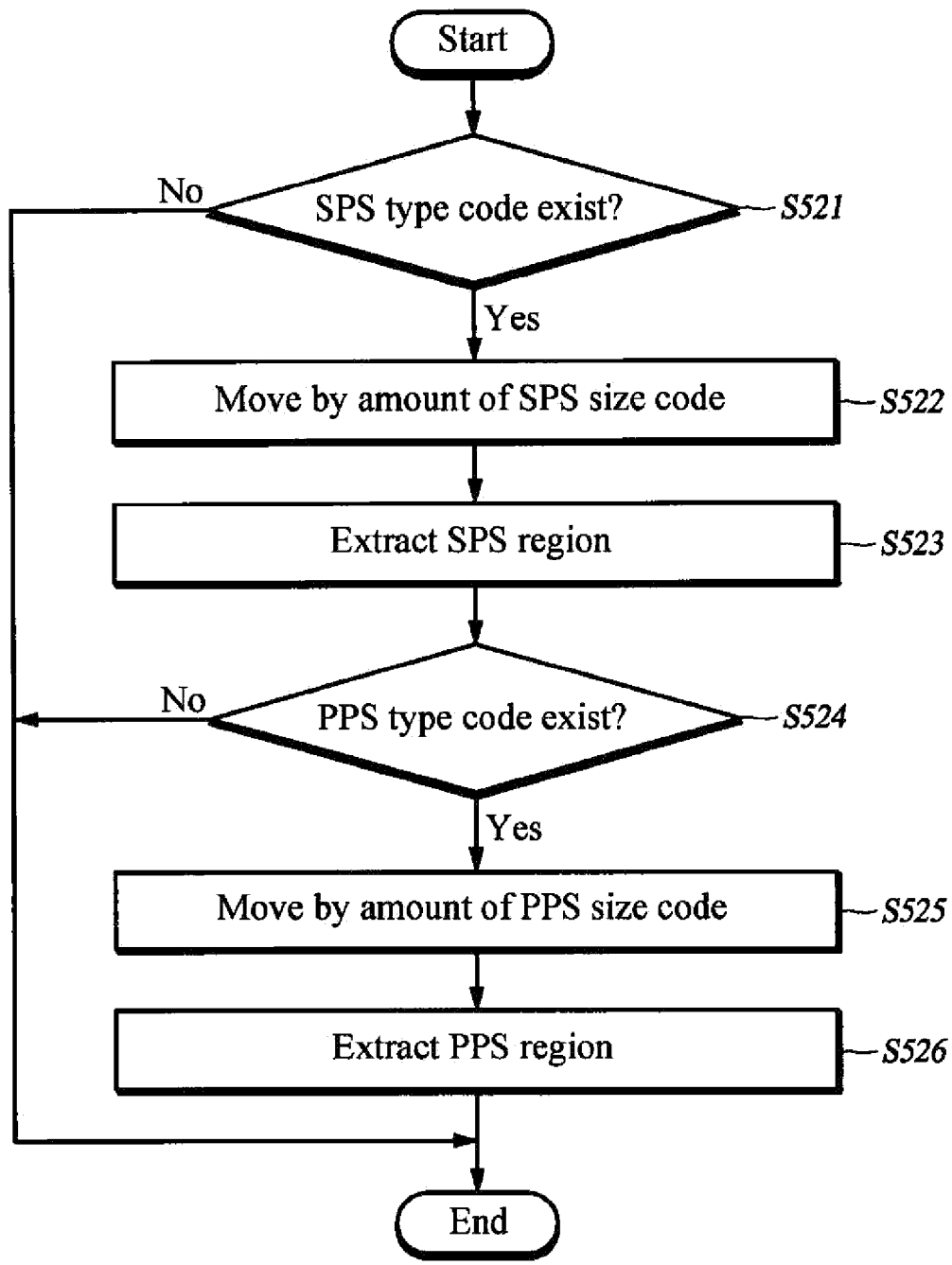
FIG. 17 is a flowchart showing the H decoding region extraction process in the codec-based video recovery method according to the second embodiment of this invention.
Figure 18:
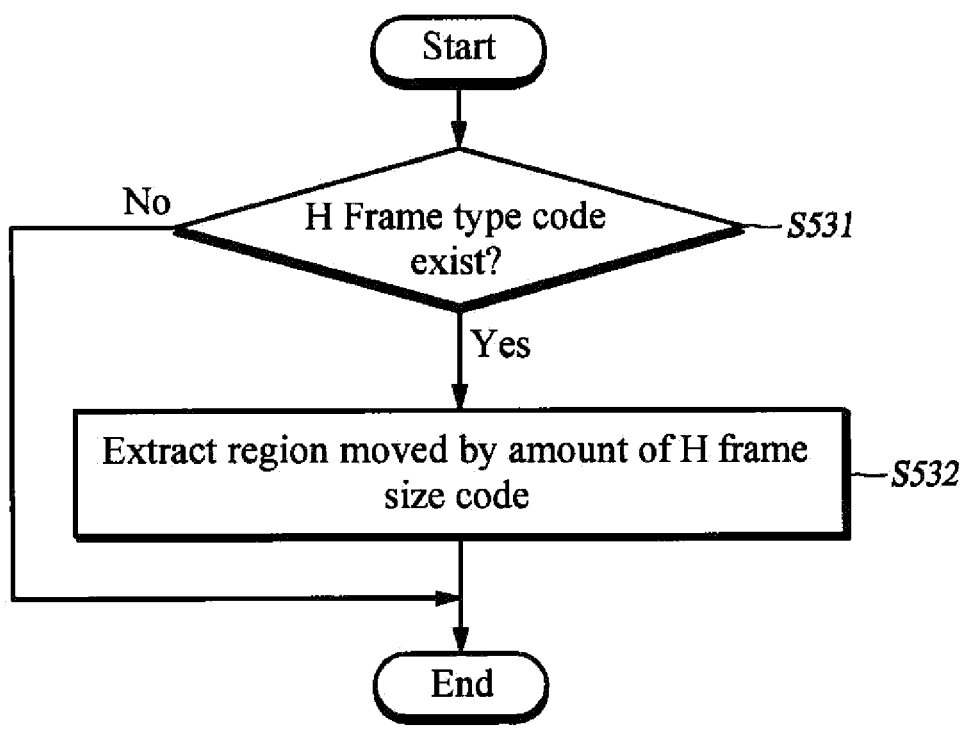
FIG. 18 is a flowchart showing the H frame region extraction process in the codec-based video recovery method according to the second embodiment of this invention.
Figure 19:
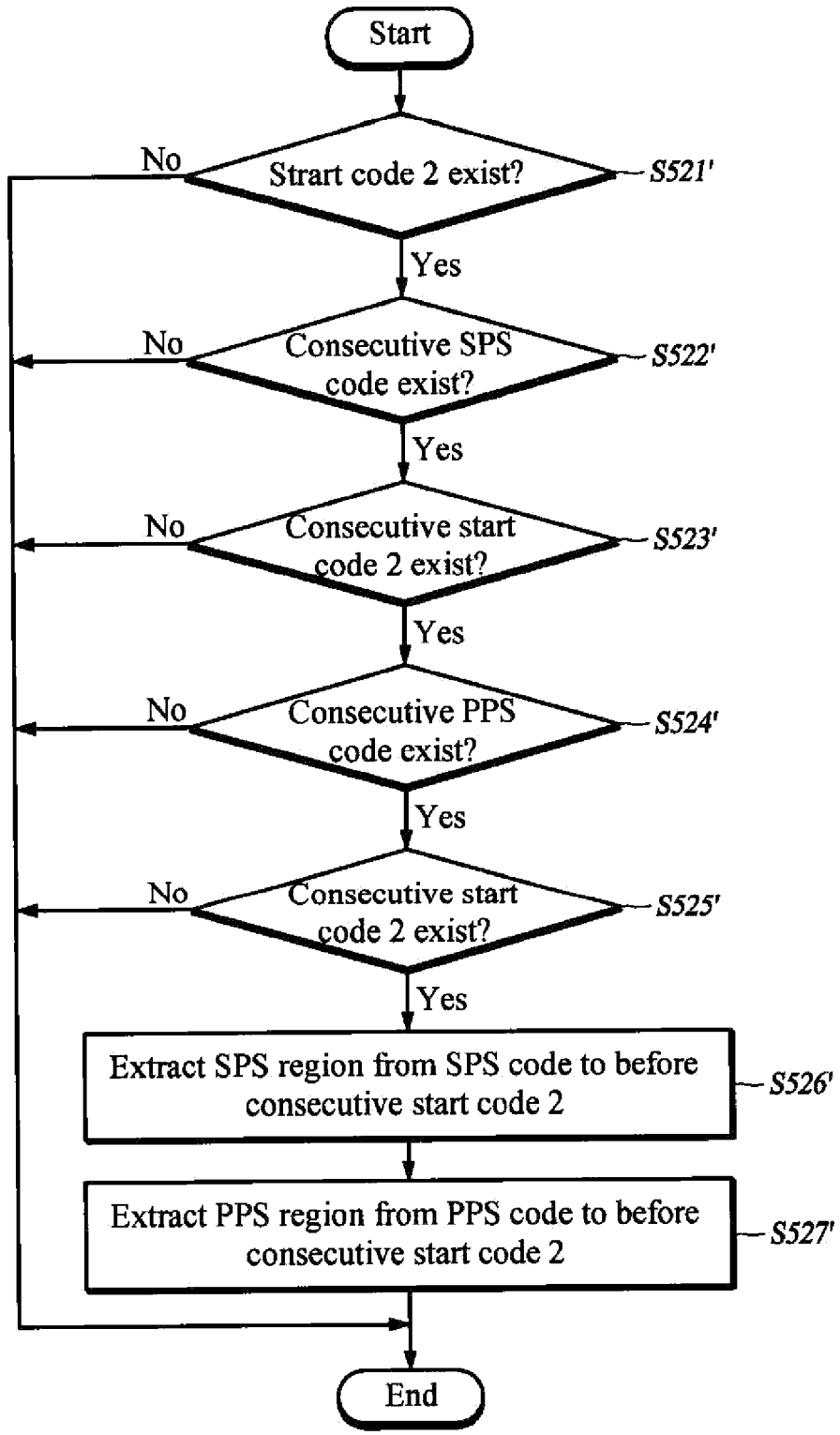
FIG. 19 is a flowchart showing another H decoding region extraction process in the codec-based video recovery method according to the second embodiment of this invention.
Figure 20:
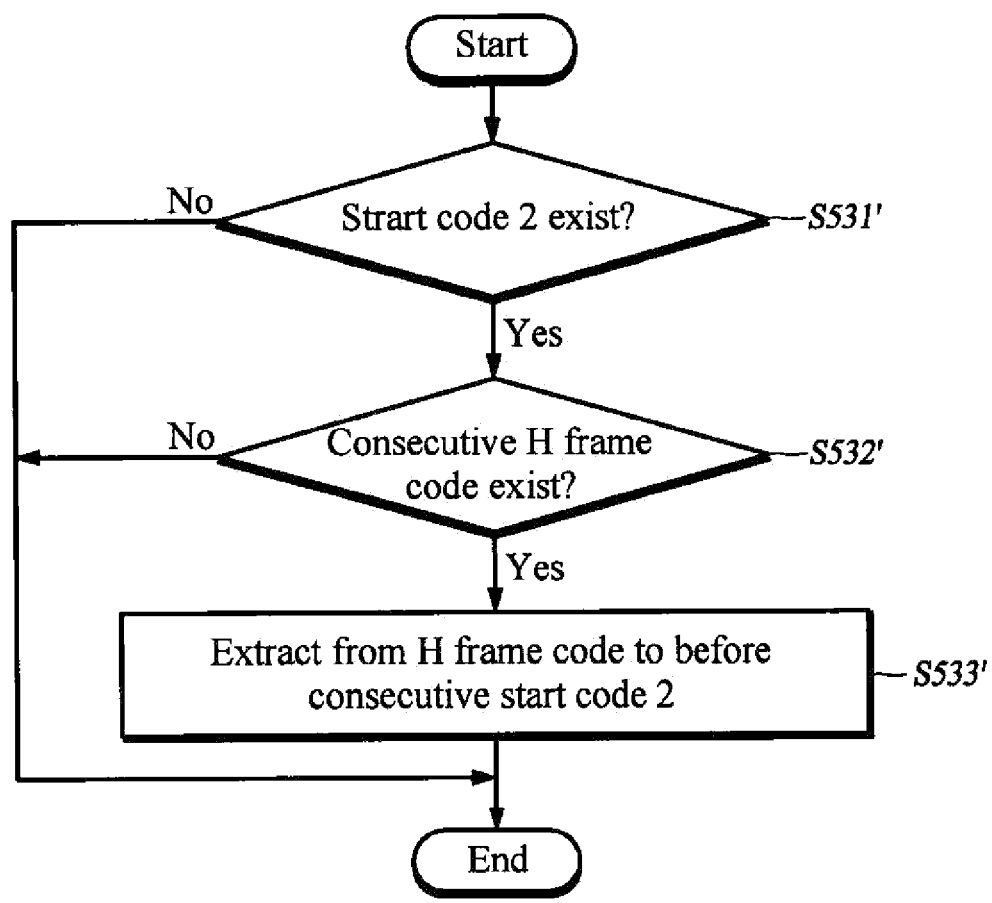
FIG. 20 is a flowchart showing another H frame region extraction process in the codec-based video recovery method according to the second embodiment of this invention.

FIG. 10 is a block diagram of the inside of the free cluster to describe the codec-based video recovery method according to the second embodiment of this invention; FIG. 11 is an example drawing drawn to describe the process wherein the decoding region is extracted in the codec-based video recovery method according to the second embodiment of this invention; FIG. 12 is an example drawing made to describe the process where the frame region is extracted in the codec-based video recovery method according to the second embodiment of this invention; FIG. 13 is an example drawing drawn to describe the process of decoding region extraction and another process for frame region extraction in the codec-based video recovery method according to the second embodiment of this invention; FIGS. 14 and 15 are example drawings drawn to describe the process wherein the decoding regions and frame regions are combined to recover the image in the codec-based video recovery method according to the second embodiment of this invention; FIG. 16 is a flowchart showing the codec-based video recovery method according to the second embodiment of this invention; FIG. 17 is a flowchart showing the H decoding region extraction process in the codec-based video recovery method according to the second embodiment of this invention; FIG. 18 is a flowchart showing the H frame region extraction process in the codec-based video recovery method according to the second embodiment of this invention; FIG. 19 is a flowchart showing another H decoding region extraction process in the codec-based video recovery method according to the second embodiment of this invention; and FIG. 20 is a flowchart showing another H frame region extraction process in the codec-based video recovery method according to the second embodiment of this invention.

The codec-based video recovery method according to the second embodiment of the invention is a method to recover videos saved using the H.264 codec. The use of the H.264 codec is on the increase with improved hardware performance of various imaging equipment and increasing resolution.

The H.264 codec is used to record videos in smart phones, etc.

Data coded using H.264 is transmitted or saved through a Network Abstraction Layer (NAL).

H.264 is largely saved in two formats. The first type of formats is that the start code 2 (5401) "0x00000001" is affixed to the front of the NAL stream, and the second type of formats is that the size information is affixed to the front of the NAL stream.

A method that affixing the startcode2 (5401) is the format that store the H.264 raw stream which is standardized in H.264 as it is, and the formats that use this method include AVI and MPEG-2 TS, etc.

On the other hand, the method that affixing size information in front of the NAL stream is mainly used for MP4 and 3GP as the AVC file format, and the videos taken with mobile phones fall under above.

Next, it is composed of decoding data comprised of SPS and PPS, and slices that fall under IDR (Instantaneous decoder refresh picture) pictures and slices that are not IDR pictures.

Slices are actual coded video data.

Slices corresponded to IDR pictures are pictures that reset slices that are not corresponded to IDR picture. In the second embodiment of this invention, slices that have been coded and recorded with the H.264 codec and are IDR pictures are referred to as "H frames," and the H.264 decoding data for the decoding of H.264 frames are referred to as "H decoding."

As in the first embodiment, when data is deleted from the storage medium, the data exist on a free cluster (100) region.

Therefore, to recover the deleted file from the storage medium, the free cluster (100) region is extracted first (Step S510).

In the free cluster (100) region above, the H frame region (510) that assumed to be recorded frames which are coded by H.264 codec and the H decoding region (550) assumed to be H.264 decoding data exist.

In the region of free cluster (100), The H frame region (510) and the H decoding region (550) may exist as single or multiple fragments.

In the invention, the H frame region (510) is, as drawn in FIG. 10, are shown as H frame region 1 (511), H frame region 2 (512), H frame region 3 (513), H frame region 4 (514), H frame region 5 (515), H frame region 6 (516), H frame region 7 (517), H frame region 8 (518), and H frame region 9 (519).

The H decoding region (15), as shown in FIG. 10, is shown as H decoding region 1 (551), H decoding region 2 (552), H decoding region 3 (553), and H decoding region 4 (554).

First, to extract the H decoding region (550) from the free cluster (100) region, as shown in FIG. 11, SPS type code (5503) "0x00XX67" is found (Step S521).

In the SPS type code (5503), "0x67" is the SPS code (5501) and "0x00XX" is the SPS size code (5502). Therefore, the SPS region (5505) can be extracted "0x00XX" away from the SPS code (5501) "0x67." (Step S522).

In "0x00XX" above, XX signifies "Don't Care," therefore it does not matter what digits come with.

In FIG. 11, "08" is in the location of XX, therefore "0x6742000BE90589C801," which is '0x0008' away from "0x000867," the SPS type code (5503), is the SPS region (5505) (Step S523).

Next, the PPS type code (5508) "0x00XY68" is located (Step S524).

In the PPS type code (5508), "0x68" is the PPS code (5507) and "0x00XY" is the PPS size code (5506). Therefore, the PPS region (5509) can be extracted "0x00XY" away from the PPS code (5507) "0x68." (Step S525)

In "0x00XY" above, XY signifies "Don't Care," therefore it does not matter what digits come with.

In FIG. 11, "05" is in the location of XY, therefore "0x68CE010F2000," which is "0x0005" away from the PPS type code (5508) "0x000568" is the PPS region (5509). (Step S526)

As recited above, when the SPS region (5505) and PPS region (5509) are extracted, one H decoding region (550) is extracted (Step S520).

By repeating in this manner, extracting the SPS regions (5505) and PPS regions (5509) from all of the free cluster (100) region, individual H decoding regions (550) assumed to be H.264 decoding data can be extracted.

To extract the H frame region (510) from the free cluster (100), as drawn in FIG. 12, the H frame type code (5103) indicating the H frame, "0x00XXXYXZ65" is found (Step S531).

In the H frame type code (5103), "0x65" is the H frame code (5101), and "0x00XXXYX" is the H frame size code (5102). Therefore, the H frame region (510) can be extracted "0x00XXXYXZ" away from the H frame code (5101) "0x65." (Step S532)

In "0x00XXXYXZ" above, XX, XY, and XZ signifies "Don't Care," therefore it does not matter what digits come with.

In FIG. 12, the place for XXXYXZ is taken up by "02," "6B," and "6D," therefore the region "0x00026B6D" away from the H frame type code (5103) "0x00026B6D65" is the H frame region (510).

Repeating in this manner, extracting H frame regions (510) from the entire free cluster (100) region above, each H frame region (510) coded and recorded with the H.264 codec can be extracted (Step S530).

Meanwhile, as drawn in FIG. 12, the frame size code exists after the H frame region (510), but if the next byte is "0x41," this becomes the H partial frame type code (5203).

In the H partial frame type code (5203), "0x41" is the H partial frame code (5201), and the frame size code located ahead of the H partial frame code (5201) is the H partial frame size code (5204).

Accordingly, as drawn in FIG. 12, "0x0000EB83" becomes the H partial frame size code (5204), and the region "0x0000EB83" away from "0x41" at the H partial frame type code (5203) "0x0000EB8341" is the H partial frame region (520).

In an H partial frame region (520), in order to increase video compression, only the parts differing from the previous H frame region (510) or subsequent H frame region (510) are recorded, making them slice data that are not IDR pictures.

Also, when a frame size code exists after the H frame region (510), but the next byte is "0x61," this becomes an H partial frame type code (5203).

The region that is formed moving as much as the H frame size code (5102) from the H frame code (5101), up to the H partial frame type code (5203) "0x0000XXXY41" or "0x0000XXXY61" can be assumed to be the H frame region (510).

As drawn in FIG. 13, in front of the SPS code (5501) "0x67," the PPS code (5507) "0x68," and the H frame code (5101) "0x65," start code 2 (5401) can be located instead of their respective size codes.

In this case, first, start code 2 (5401), "0x00000001" is located in the free cluster (100) region, and the next byte is checked to see if it is "0x67." (Step S522).

Next, a new start code 2 (5401), "0x00000001," is located (Step S523), and the next byte is checked to see if it is "0x68." (Step S524).

Next, if there is a new start code 2 (5401), "0x00000001," (Step S525) the region from SPS code (5501) "0x67" to start code 2 (5401) "0x00000001" is extracted as the SPS region (5505) (Step S526), and the region from the PPS code (5507) "0x68" up to start code 2 (5401) "0x00000001" is extracted as the PPS region (5509) completing extraction of the H decoding region (550). (Step S527).

In addition, if an H frame code (5101) "0x65" exists after start code 2 (5401) "0x00000001," (Step S531), the region from the H frame code (5101) up to the new start code 2 (5401) can be extracted as the H frame region (510). (Step S533)

As recited above, after extracting multiple H frame regions (510) and H decoding regions (550), as drawn in FIG. 14, the multiple H frame regions (510) and multiple H decoding regions (550) are interconnected to form an H.264 visual bit stream that can be decoded with the H.264 decoder (Step S540).

As in the first embodiment, H frame region (510) is shown as H frame region 1 (511) or H frame region 9 (519), and the H decoding region (550) is shown as H decoding region 1 (551) or H decoding region 4 (554), allowing a total of 36 different cases of bit streams resulting from the interconnection of H frame regions (510) and H decoding regions (550).

Next, decoding the bit stream with the decoder, as drawn in FIG. 15, bit streams for which decoding is successful generate a recovered image (600) (Step S550), and data is not generated for bit streams for which decoding fails.

The recovered image (600) is a still image, therefore by visually inspecting the connectivity of individual still image, the video can be recovered by a linking still images.

The methods in the first and second embodiments of this invention can be programmed and stored on storage media such as CD-ROM, memory, ROM, EEPROM, etc., to be read by a computer.

The method wherein image frame index data is used to join fragmented video data and recover an image frame, according to the third embodiment of the invention, comprises the decoding step, where the clusters of the storage medium are decoded to create at least one cluster group comprising independent frames; the index data search step where clusters of the storage medium are decoded to locate at least one index data; and the image frame formation step, where among the cluster groups generated through the decoding step above, one cluster group included in the index data is formed into an image frame, or multiple cluster groups are linked to form an image frame.

If fragmented video data is at least partially left on the storage medium, according to the cluster search-based video recovery method and storage medium therefor of the invention, the index data that can be gained in the process of recovering the image frame can be used to determine the order of the fragmented video data to join them to recover a single image frame.

Figures 21, 22:
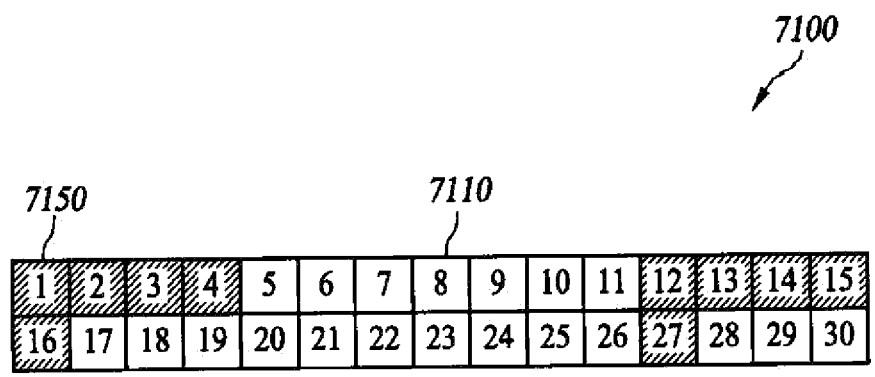
FIG. 21 is an example drawing drawn to describe the video recovery method according to the third embodiment of the invention.
FIG. 22 is an example drawing drawn to describe decoding according to the third embodiment of the invention.
Figure 23:
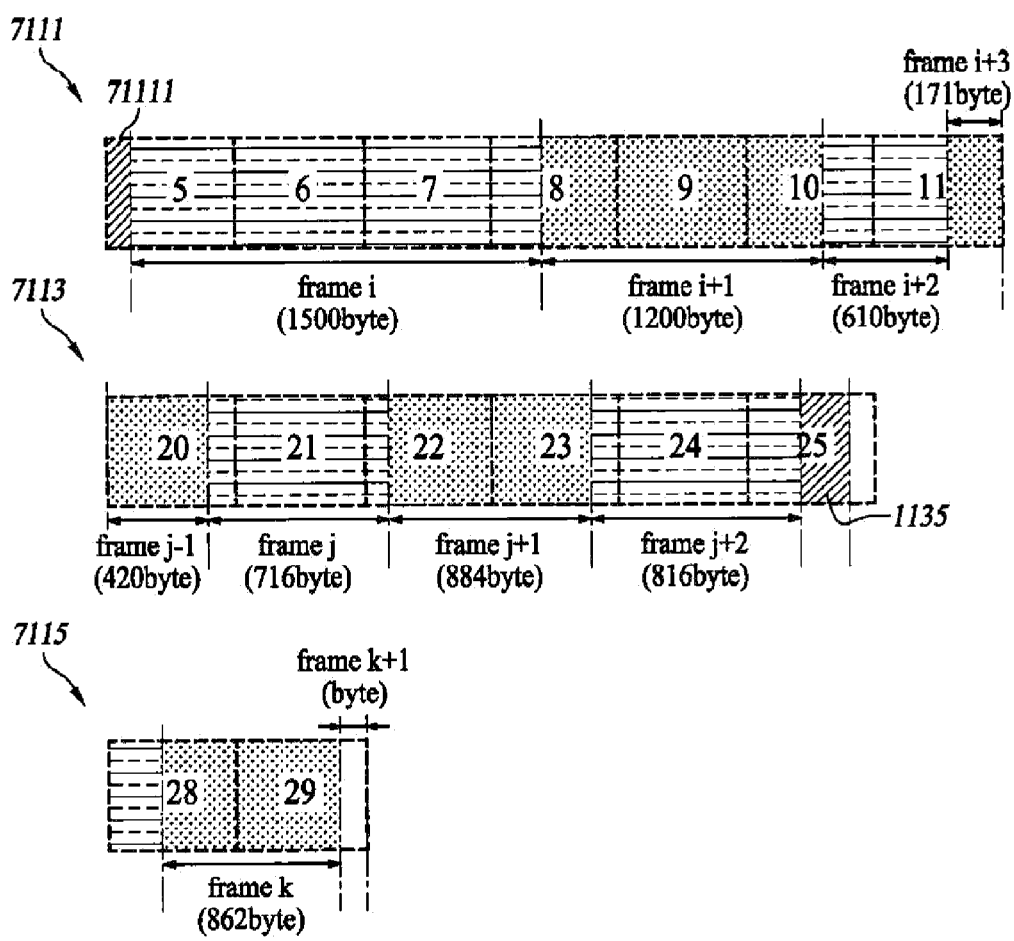
FIG. 23 is an example drawing showing the cluster groups generated by decoding according to the third embodiment of this invention.
Figure 24:
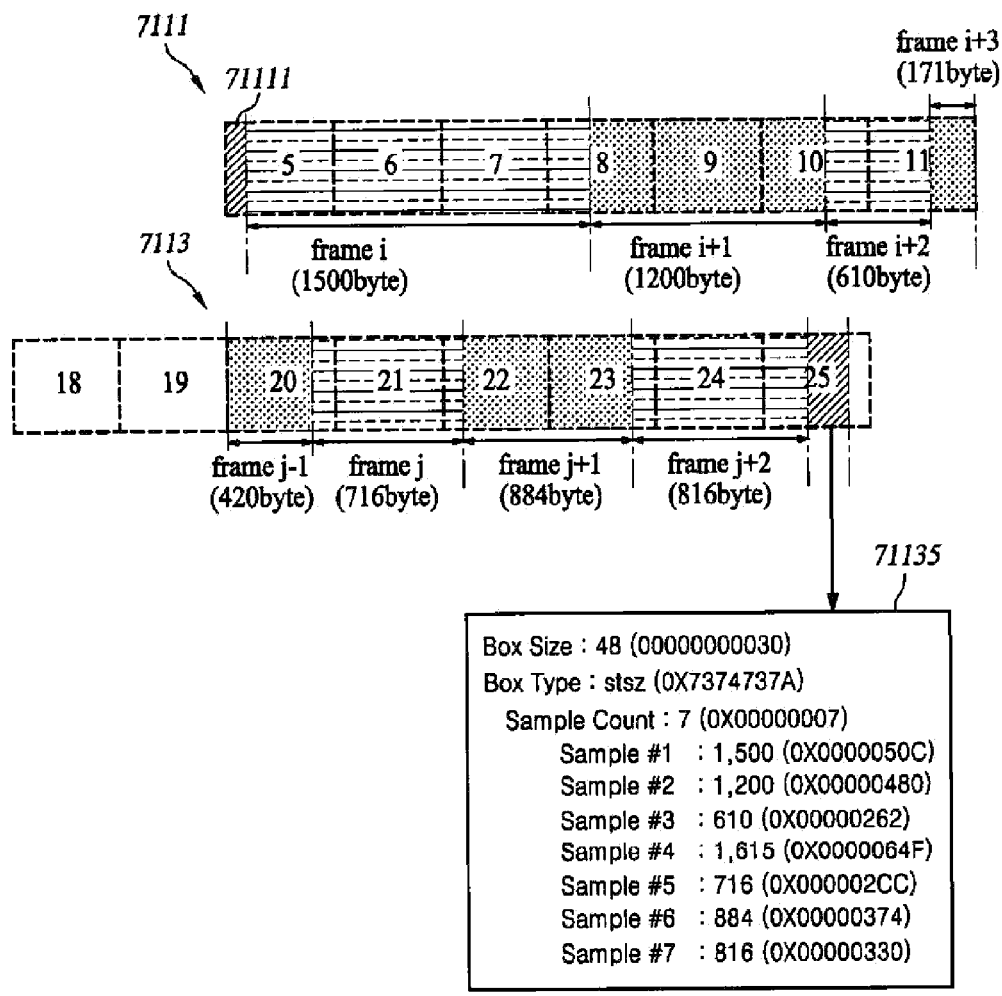
FIG. 24 is an example drawing drawn to describe the process of recovering frames from the cluster groups according to the third embodiment of this invention.
Figure 25:
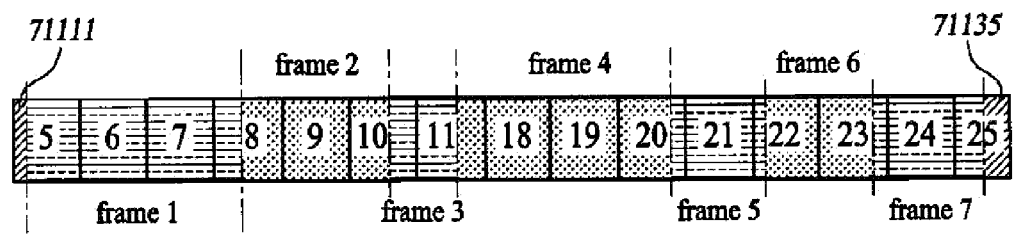
FIG. 25 is an example drawing showing an image frame recovered according to the video recovery method according to the third embodiment of the invention.
Figure 26:
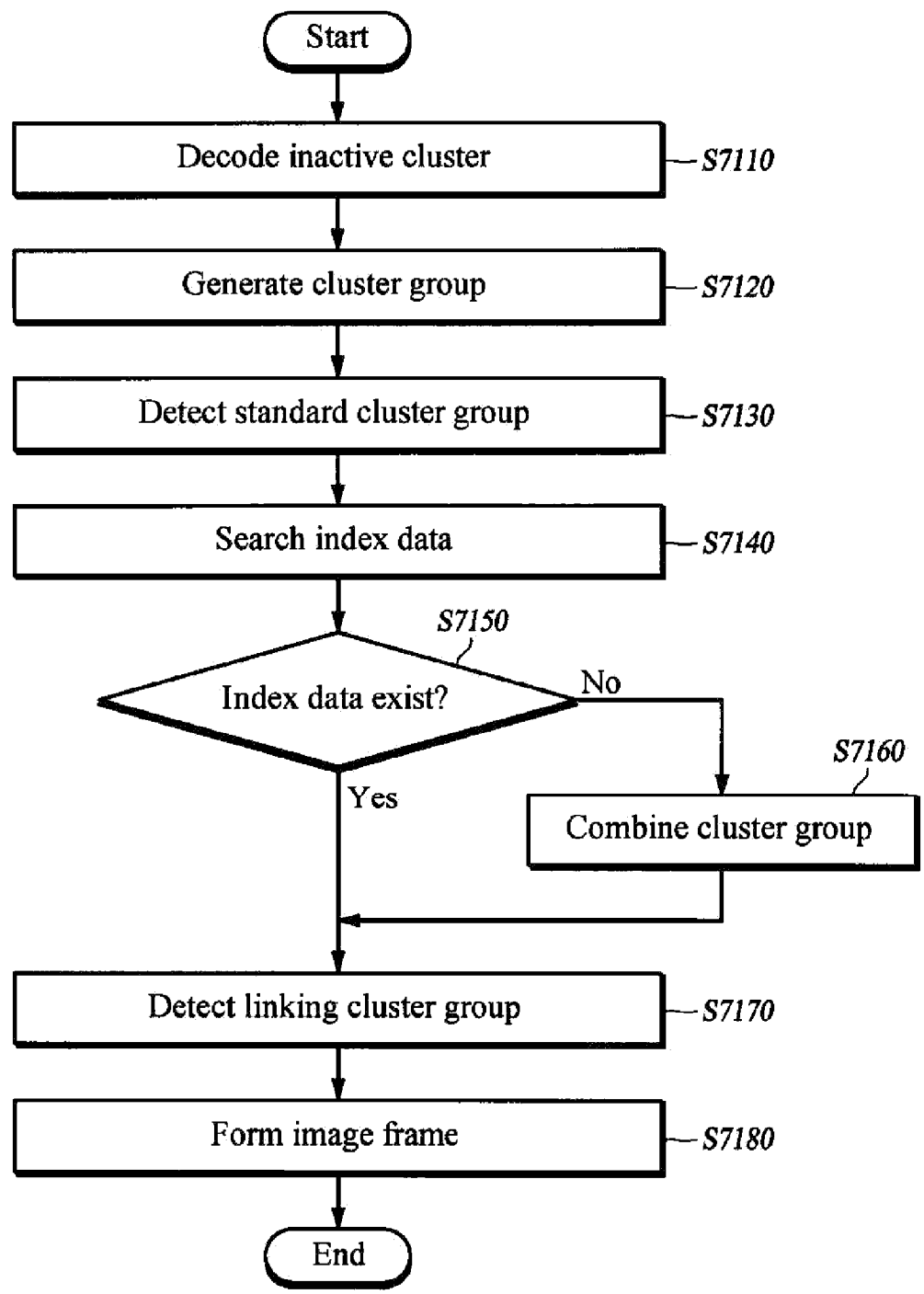
FIG. 26 is a flowchart showing the cluster search-based video recovery method according to the third embodiment of the invention.

FIG. 21 is an example drawing drawn to describe the video recovery method according to the third embodiment of the invention; FIG. 22 is an example drawing drawn to describe decoding according to the third embodiment of the invention; FIG. 23 is an example drawing showing the cluster groups generated by decoding according to the third embodiment of this invention; FIG. 24 is an example drawing drawn to describe the process of recovering frames from the cluster groups according to the third embodiment of this invention; FIG. 25 is an example drawing showing an image frame recovered according to the video recovery method according to the third embodiment of the invention; FIG. 26 is a flowchart showing the cluster search-based video recovery method according to the third embodiment of the invention.

The video recovery method according to the third embodiment of the invention allows for recovery of image frames through decoding, even when a fragmented file has some of its clusters overwritten by a different file, if video data is even partially present on the storage medium (7100).

Also, comparing the index data that can be gained in the process of recovery, and the size of the recovered image frame, the order of the scattered image frame fragments can be determined to join these and make a single video file.

This invention, as drawn in FIG. 26, comprises the inactive cluster decoding step (Step S7110), cluster group generation step (Step S7120), reference cluster group detection step (Step S7130), index data search step (Step S7170), and the image frame forming step (Step S7180).

If no index data exists, a cluster group combination step (Step S7160) is included.

First, as drawn in FIG. 21, on a storage medium (7100) including active clusters (7150) where data is stored and used, and inactive clusters (7110) where data was stored then deleted, decoding is performed for all inactive clusters (7110). (Step S7110).

Decoding may be performed from the first inactive cluster to the last inactive cluster of the storage medium (7100).

Note, as video frames are variable length coded by the codec, if part of the frame is damaged, decoding is not performed normally.

For example, in decoding, as drawn in FIG. 22, with the code book set beforehand, if data is present that does not exist in that code book, an error occurs and decoding does not proceed.

Here, the following data is discarded, and normally, the next frame with a frame start code is where decoding resumes normally.

When decoding of inactive clusters (7110) is completed, at least one cluster group including independent frames is generated (Step S7120).

For example, as drawn in FIG. 23, cluster group 1 (7111) comprising frame i, frame i+1, frame i+2, and frame i+3, and cluster group 2 (7113) comprising frame j, frame j+1, and frame j+2, and cluster group 3 (7115) comprising frame k and frame k+1, can be generated.

The unexplained code 71111 contains type information indicating the standard of the video, including mp4, 3gp, avi, mov, and h.264, etc., and 71135 is index data, indicating the location and size data of frames.

In cluster group 1 (7111), decoding was performed from cluster 5, and an error occurred at cluster 11. Frame i, frame i+1, and frame i+2 were decoded, and frame i+3 was not decoded.

In cluster group 2 (7113), an error occurred at cluster 20, with decoding performed until cluster 25, with frame j, frame j+1, and frame j+2 decoded, but frame j−1 not decoded.

In cluster group 3 (7115) above, decoding was performed from cluster 28, with an error occurring at cluster 29, with decoding completed up to frame k, and frame k+1 not decoded.

Frames decoded in the process of inactive cluster decoding, frames not decoded due to errors, the size data of individual frames, the location data of individual frames and other temporary index data can be stored in the storage medium (7100).

Frame i of cluster group1 has a size of 1500 bytes, and is stored as located clusters 5, 6, 7 and part of cluster 8.

Frame i+1 has a size of 1200 bytes, and is stored as located in part of duster 8, cluster 9 and part of cluster 10.

Frame i+2 has a size of 610 bytes, and is stored as located in part of 10 and part of cluster 11.

Frame i+3 has a size of 171 bytes, and is stored as located in part of cluster 11.

In cluster group 2 (7113), frame j−1 is stored as having a size of 420 bytes and located in part of cluster 20.

Frame j has a size of 716 bytes, and is stored as located in part of cluster 20, cluster 20, and part of cluster 22.

Frame j+1 has a size of 884, and is stored as located in cluster 22 and part of cluster 23.

Frame j+2 has a size of 816 bytes, and is stored as located in part of cluster 23, cluster 24, and part of cluster 25.

In cluster group 3 (7115), frame k is stored as having a size of 862 bytes, and located in part of cluster 28 and part of cluster 29.

Frame k+1 is stored as located on part of cluster 29.

Next, all inactive clusters (7110) are searched to find index data wherein the sizes of the frames belonging to the reference cluster groups are arranged in sequence.

More than one of the index data can be found as well.

When the cluster groups are hereby generated, and index data is found, comparison of the frame data composing the cluster group and the frame data included in the index data allows the arrangement of cluster groups according to their sequence in the index data, recovering a single image frame.

For example, among the frames composing cluster group 1 (7111), cluster group 2 (7113) and cluster group 3 (7115), if the frame data contained in the index data and the frames included in cluster group 1 (7111) and cluster group 2 (7113) are identical, the cluster group 1 (7111) and cluster group 2 (7113) can be arranged in sequence to recover a single image frame.

When multiple cluster groups are generated, and multiple index data is found, these can each be compared to each other, and arranging the cluster groups according to the sequence in the index data can recover multiple image frames.

While in the above description, index data is searched after decoding of clusters, the invention is not limited to this order, and cluster decoding can be performed after first searching index data.

Meanwhile, if a decoded cluster group is generated as recited above, the user may select the images to recover among these, and cluster groups including the selected images may be detected (Step S7130).

To allow the user to select the images to recover, the decoded images are shown on the screen, and user selects the image that is the image to be recovered.

Here, to facilitate selection by the user, it is possible to only show intra-frames, which can be independently encoded and decoded, for selection.

A decoding program can be used to see the decoded images.

Through this method, if a cluster group containing the frame selected by the user exists, this is a cluster group that has already been recovered. Therefore the following process involves finding cluster groups to link to the recovered cluster group.

Among the recited cluster groups, the cluster group selected by the user which has the frames the user wants recovered is called the reference cluster group, and the cluster groups to be linked to the reference cluster groups are called linking cluster groups.

For example, among the frames composing cluster group 1 (7111), cluster group 2 (7113) and cluster group 3 (7115) generated as recited above, if cluster group 1 (7111) is detected as the reference cluster group, the others, cluster group 2 (7113) and cluster group 3 (7115) are candidate linking cluster groups that can be linked to cluster group 1 (7111) above.

Meanwhile, while in the recited example cluster group 1 (7111) was detected as the reference cluster group, depending on which image is selected for recovery by the user, cluster group 2 (7113) or cluster group 3 (7115), instead of cluster group 1 (7111), can be detected as the reference cluster group.

Also, any of the cluster groups recovered without user selection may be able to be the reference cluster group.

Next, all inactivated clusters (7110) are searched to find index data wherein the sizes of the frames belonging to the reference cluster groups are arranged in sequence. (Step S7140).

In the following, as drawn in FIG. 24, it is described that the index data (71135) including the sizes of the frames of cluster group 1 (7111) detected as the reference cluster group is located on cluster 25.

While in this description of the invention, reference cluster groups are first detected followed by searching for index data (71135), it is possible to first search for index data (71135) then detect reference cluster groups comprising frames included in the index data (71135).

In the invention, the index data (71135) example shows that the complete image frame comprises 7 frames.

Next, if index data (71135) exists, the frame data included in the reference cluster group and the frame data stored in the index data (71135) are compared (Step S150).

For example, as drawn in FIG. 24, comparison between the reference cluster group cluster group 1 (7111) and the index data (71135) above, it can be seen that the size data of frame i, frame i+1, and frame i+2 are identical to the sizes of the first, second and third samples of the index data (71135), respectively.

Therefore, it can be known that the index data (71135) consists of frame data included in the reference cluster group.

Next, linking cluster groups including the frame data except corresponding to the reference cluster group in the index data (71135) are detected (Step S7170).

For example, as seen in the index data (71135) above, the information that corresponds to the first or third sample corresponds to the reference cluster group, therefore the linking cluster groups corresponding to the fourth or seventh sample are searched.

Therefore, comparing cluster group 2 (7113) and cluster group 3 (7115), excluding reference cluster group 1 (7111) above, with the index data (71135), as the sizes of frames j, j+1 and j+2 of cluster group 2 (7113) are identical to the 5th, 6th and 7th samples of the index data, cluster group 2 (7113) becomes the linking cluster group to be linked to cluster group 1 (7111) above.

Following this step, the reference cluster group and linking cluster groups are linked to form the image frame (Step S7180).

Therefore, to form the image frame, cluster group 1 (7111) and cluster group 2 (7111) may be able to be linked.

Meanwhile, after linking the reference cluster group and linking cluster group to form the image frame, and resuming decoding from the last frame of the reference cluster group, a shortage in data to link between the reference cluster groups and linking cluster group may result in an error.

In this case, decoding is performed while expanding the cluster between the reference cluster group and linking cluster group.

For example, when after cluster group 1 (7111) and cluster group 2 (7113) have been linked, decoding resumes from the last frame of the reference cluster group, an error occurs between cluster group 1 (7111) and cluster group 2 (7113).

This is because, after connecting cluster group 1 (7111) and cluster group 2 (7113), when comparing with the index data (71135), the frame corresponding to the fourth sample does not exist.

Therefore by expanding the latter portion of cluster group 1 (7111) or front portion of cluster group 2 (7113) to match the size of the fourth sample, cluster group 1 (7111) and cluster group 2 (7113) should be linked.

As the size of the fourth sample is 1615, and the size of frame i+3 in the latter part of cluster group 1 (7111) is 171 bytes, with the size of frame j−1 in the forward part of cluster group 2 (7113) at 420, comparison of the size of the fourth sample and the sum of frame i+3 and j−1 indicates a shortage of 1024 bytes.

If the size of one cluster has been set at 512 bytes, two additional clusters are required to match the size of the fourth sample above.

Note the size of clusters can be set differently according to the type of storage medium (7100).

Given this situation, there are three possibilities for expansion.

The three possibilities are: expanding the 2 clusters behind cluster group 1 (7111), expanding the 2 clusters before cluster group 2 (7113), and expanding 1 cluster behind cluster group 1 (7111) and one cluster ahead of cluster group 2 (7113).

Among the three methods above, the proper expansion is when decoding of the frame corresponding to the fourth sample is successfully completed.

In the invention, as drawn in FIG. 24, two clusters ahead of cluster group 2 (7113), that is, clusters 18 and 19 between clusters 11 and 20 were expanded, normally decoding the frame corresponding to the fourth sample.

Hereby, the sizes of frame i+3, cluster 18, cluster 19 and frame j−1 are added to correspond to the size of the fourth sample.

Trough this method, type data (71111), cluster group 1 (7111), cluster group 2 (7113), and index data (71135) are combined to form a complete video frame.

Therefore, frame i becomes frame 1, frame i+1 becomes frame 2, frame i+2 becomes frame 3, frame i+3, cluster 18, cluster 19 and frame j−1 become frame 4, frame j becomes frame 5, frame j+1 becomes frame 6, and frame j+2 becomes frame 7.

While in this invention, linking cluster groups have been described as being connected after the reference cluster group, the invention is not restricted to this, and, if the reference cluster group is not the starting point of the video, linking cluster groups can be linked to before the reference cluster group using the method recited above.

Voice data as well as video data, can be recovered in the same method.

Meanwhile, when searching for index data after detecting the selected cluster groups, the index data (71135) may not exist due to having been overwritten by other files (Step S7150).

Here, all inactive clusters (7110) are searched, and decoding is performed. Parts where errors occur are judged to be the ends of cluster groups, and individual clusters that are potentially linked to these ends are each linked (Step S7160).

Using this method, clusters that decode normally after connection are detected as the linking cluster groups, and the video data is recovered.

Therefore, if cluster group 1 (7111) has been detected as the reference cluster group, but linking cluster groups cannot be found because index data (71135) is missing, All cluster groups become candidates for the linking cluster groups that need to be linked to the reference cluster group.

Therefore, cluster group 2 (7113) or cluster group 3 (7115) are each linked to cluster group 1 (7111) above, after which decoding is performed. The cluster group after the linking of which decoding is performed normally can be detected as the linking cluster group.

A shortage in data to link between the reference cluster group and linking cluster group leading to failure to decode is dealt with by expanding the clusters between the reference cluster group and an arbitrary cluster group one by one until normal decoding is performed.

The limit to the size to which clusters can be expanded to here may be several times the difference between the sum of the size of the last frame that was not normally decoded and the first frame not normally decoded in the linking cluster group, and the maximum size among the frames recovered until now.

However, as index data (71135) is missing, it cannot be predicted beforehand which cluster group will be linked, and it is not possible either to predict how much data expansion must take place behind the reference cluster group and ahead of the candidate linking cluster group.

Therefore, by designating an arbitrary cluster group, setting the expansion limit to several times a predetermined cluster size, expanding to all sizes possible under this expansion limit, and attempting decoding in all these cases, the case wherein decoding proceeds normally will identify the corresponding cluster as the linking cluster.

The maximum size for expansion is smaller than the maximum value among all frames to be recovered.

While the maximum value cannot be known in the process of expanding and linking, if a maximum is not set, the number of possible expansion outcomes becomes infinite, therefore a maximum must be set.

While the sizes of coded frames differ according to complexity of the image, the coder tries to keep frame size similar through bit rate control, and therefore cases wherein an arbitrary frame is tens of times larger than another frame are very rare.

Therefore, based on the maximum size of frames recovered to this point, the size of the deficient data may be set to several times this size, and the size of the expansion is determined accordingly.

This method of linking appropriate cluster groups to reference cluster groups, regenerating a renewed reference cluster group, then again connecting an appropriate cluster group to the new reference cluster group, is repeated.

When all cluster groups have been expanded to the maximum, but decoding errors still occur, this means that the cluster group that needs to be linked has been overwritten by another file.

In this case, the sizes of frames not yet recovered are compared to the frames in cluster groups excluding the recovered cluster groups. Matches are found, and the user is prompted to select the image to recover. The process is repeated from the index data search step above.

The cluster search-based video recovery method of Step S7110 and Step S7180 according to this invention may be programmed and recorded on recording media such as CD-ROM, memory, ROM, EEPROM, etc., to be read by a computer.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

INDUSTRIAL APPLICABILITY

The codec-based video recovery method of this invention has the effect of recovering video by linking recovered images into a recovered video even when the video file is fragmented and data is partially overwritten.

The invention claimed is:

1. A cluster search-based video recovery method comprising:
   (a) a decoding step where the clusters of the storage medium (7100) are decoded to generate at least one cluster group including independent frames;
   (b) an index data search step where the clusters of the storage medium are decoded to search for at least one index data; and
   (c) an image frame formation step where one cluster group included in the index data among the cluster group generated through the decoding step is formed as an image frame, or multiple cluster groups are connected to form an image frame,
   wherein a reference cluster where independent frame data is included in the index data is detected from among the cluster group generated through the decoding step, then a linking cluster group, excluding the reference cluster group, where independent frame data is included in the index data, is detected, and, by linking the reference cluster group and linking cluster group to form an image frame,
   wherein the image frame forming step includes a repeat decoding step where decoding is repeated from the last frame of the reference cluster group, after linking the reference cluster group and the linking cluster group,
   wherein the repeat decoding step includes an expansion step where, when an error occurs, the cluster is expanded between the reference cluster group and linking cluster group, enabling decoding to be performed, and
   wherein regarding the size of the cluster that is configured to be expanded in the expanding step, the sum of the size of the last frame that was not normally decoded in the reference cluster, the size of the first frame not normally decided in the linking cluster group, and the size to be expanded between the reference cluster group and linking cluster group, is configured to be less than or equal to the size of the last frame when normally decoded from the reference cluster group.

2. The cluster search-based video recovery method of claim 1, wherein in the decoding step, an error occurs during decoding of clusters, decoding resumes from the next frame.

3. The cluster search-based video recovery method of claim 1, wherein the decoding step includes a saving step where the decoded frame and the temporary index data of each frame is saved.

4. The cluster search-based video recovery method of claim 1, wherein in the image frame formation step a complete image is generated by joining all reference cluster groups and linking cluster groups, then combining index data.

5. The cluster search-based video recovery method of claim 1, wherein the decoding step takes place after the index data search step.

6. The cluster search-based video recovery method of claim 1, wherein the index data search step includes a detection step where, if index data cannot be found, arbitrary cluster groups among those cluster groups generated through the decoding step are each linked to a reference cluster group, after which decoding is performed to detect the cluster groups where decoding proceeds normally as linking cluster groups.

7. The cluster search-based video recovery method of claim 6, wherein in the detection step clusters are expanded between the reference cluster group and an arbitrary cluster group for performance of decoding, and the size of the expandable clusters is configured to be decided by comparing the sizes of the last frame not normally decoded in the reference cluster group, the first frame not normally decoded in the linking cluster group, and the frame with the largest size among the frames recovered so far.

8. Recording media whereon a program executing the cluster search-based video recovery method of claim 1 is recorded and read by a computer.

* * * * *